(12) United States Patent
Zhang et al.

(10) Patent No.: US 10,620,012 B2
(45) Date of Patent: Apr. 14, 2020

(54) STEP COUNTING METHOD, DEVICE, AND TERMINAL

(71) Applicant: Huawei Technologies Co., Ltd., Shenzhen (CN)

(72) Inventors: Xiaoping Zhang, Shenzhen (CN); Yajun Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 268 days.

(21) Appl. No.: 15/745,911

(22) PCT Filed: Jul. 18, 2016

(86) PCT No.: PCT/CN2016/090323
§ 371 (c)(1),
(2) Date: Jan. 18, 2018

(87) PCT Pub. No.: WO2017/012526
PCT Pub. Date: Jan. 26, 2017

(65) Prior Publication Data
US 2018/0202830 A1    Jul. 19, 2018

(30) Foreign Application Priority Data
Jul. 21, 2015    (CN) .......................... 2015 1 0430687

(51) Int. Cl.
*G01C 22/00*    (2006.01)
(52) U.S. Cl.
CPC .......... *G01C 22/006* (2013.01); *G01C 22/00* (2013.01)
(58) Field of Classification Search
None
See application file for complete search history.

(56) References Cited

U.S. PATENT DOCUMENTS

| 8,879,763 B2* | 11/2014 | Burns | H04R 25/50 |
| | | | 381/312 |
| 2011/0054838 A1 | 3/2011 | Rottler et al. | |

(Continued)

FOREIGN PATENT DOCUMENTS

| CN | 1815145 A | 8/2006 |
| CN | 102282575 A | 12/2011 |

(Continued)

OTHER PUBLICATIONS

Foreign Communication From a Counterpart Application, European Application No. 16827217.7, Partial Supplementary European Search Report dated May 9, 2018, 11 pages.

(Continued)

*Primary Examiner* — Roy Y Yi
(74) *Attorney, Agent, or Firm* — Conley Rose, P.C.

(57) ABSTRACT

A step counting method, a device, and a terminal, where the method includes obtaining, by a first device, step counting data of at least two devices carried by a same user, where the first device is one of the at least two devices, or the first device is different from the at least two devices, and determining, by the first device, a quantity of steps of the user according to the step counting data of the at least two devices. In the method, the quantity of steps of the user is determined according to the step counting data of the at least two devices of the same user in order to avoid a step counting error caused when a single device performs step counting, thereby improving step counting accuracy.

20 Claims, 8 Drawing Sheets

(56) References Cited

U.S. PATENT DOCUMENTS

| | | | |
|---|---|---|---|
| 2012/0116719 A1 | 5/2012 | Takahashi et al. | |
| 2014/0066816 A1 | 3/2014 | McNames et al. | |
| 2014/0122012 A1 | 5/2014 | Barfield et al. | |
| 2014/0164611 A1* | 6/2014 | Molettiere | A61B 5/1112 709/224 |
| 2014/0180453 A1 | 6/2014 | Weast et al. | |
| 2014/0236531 A1 | 8/2014 | Carter | |
| 2016/0072559 A1 | 3/2016 | Chen et al. | |
| 2017/0227375 A1* | 8/2017 | Parikh | G01C 25/00 |
| 2017/0261335 A1 | 9/2017 | Hoffman et al. | |

FOREIGN PATENT DOCUMENTS

| | | |
|---|---|---|
| CN | 202149782 U | 2/2012 |
| CN | 102481128 A | 5/2012 |
| CN | 202974291 U | 6/2013 |
| CN | 103791915 A | 5/2014 |
| CN | 102449561 B | 6/2014 |
| CN | 103997572 A | 8/2014 |
| CN | 104075730 A | 10/2014 |
| CN | 104158578 A | 11/2014 |
| CN | 104580660 A | 4/2015 |
| EP | 2612595 B1 | 11/2014 |
| EP | 2927643 A1 | 10/2015 |

OTHER PUBLICATIONS

Foreign Communication From a Counterpart Application, Chinese Application No. 201510430687.7, Chinese Office Action dated May 31, 2019, 7 pages.

Machine Translation and Abstract of Chinese Publication No. CN1815145, Aug. 9, 2006, 9 pages.

Machine Translation and Abstract of Chinese Publication No. CN102282575, Dec. 14, 2011, 56 pages.

Machine Translation and Abstract of Chinese Publication No. CN103791915, May 14, 2014, 13 pages.

Machine Translation and Abstract of Chinese Publication No. CN103997572, Aug. 20, 2014, 19 pages.

Machine Translation and Abstract of Chinese Publication No. CN104075730, Oct. 1, 2014, 26 pages.

Machine Translation and Abstract of Chinese Publication No. CN104580660, Apr. 29, 2015, 39 pages.

Machine Translation and Abstract of Chinese Publication No. CN202149782, Feb. 22, 2012, 8 pages.

Machine Translation and Abstract of Chinese Publication No. CN202974291, Jun. 5, 2013, 12 pages.

Foreign Communication From a Counterpart Application, PCT Application No. PCT/CN2016/090323, English Translation of International Search Report dated Oct. 21, 2016, 3 pages.

Foreign Communication From a Counterpart Application, PCT Application No. PCT/CN2016/090323, English Translation of Written Opinion dated Oct. 21, 2016, 7 pages.

* cited by examiner

STEP COUNTING METHOD, DEVICE, AND TERMINAL

CROSS-REFERENCE TO RELATED APPLICATIONS

This application is a U.S. National Stage of International Patent Application No. PCT/CN2016/090323 filed on Jul. 18, 2016, which claims priority to Chinese Patent Application No. 201510430687.7 filed on Jul. 21, 2015. Both of the aforementioned applications are hereby incorporated by reference in their entireties.

TECHNICAL FIELD

The present disclosure relates to the terminal field, and in particular, to a step counting method, a device, and a terminal.

BACKGROUND

Existing wearable devices such as smart bands and smartwatches usually have a step counting function. A motion sensor integrated into a product is used to sense a body movement so as to implement step counting, and further to estimate parameters such as a walking distance and consumption of calories according to a quantity of steps.

For a user wrist wearable product such as a smart band and a smartwatch, arms have a greater degree of freedom than a body, and people always do a lot of things with their hands in daily life. Even if they do not walk, a smart band (watch) motion sensor also dynamically outputs a signal provided that they do things with their hands. This easily causes a step counting error and affects step counting performance.

Therefore, how to improve step counting accuracy becomes a problem of common concern in the industry.

SUMMARY

Embodiments of the present disclosure provide a step counting method, a device, and a terminal in order to avoid a step counting error caused when a single device performs step counting, thereby improving step counting accuracy.

A first aspect provides a step counting method, including obtaining, by a first device, step counting data of at least two devices carried by a same user, where the first device is one of the at least two devices, or the first device is different from the at least two devices, and determining, by the first device, a quantity of steps of the user according to the step counting data of the at least two devices.

With reference to the first aspect, in a first possible implementation, determining, by the first device, a quantity of steps of the user according to the step counting data of the at least two devices is implemented as determining, by the first device, the quantity of steps of the user according to a same or similar walking characteristic in motion data of the at least two devices.

With reference to the first possible implementation of the first aspect, in a second possible implementation, determining, by the first device, the quantity of steps of the user according to a same or similar walking characteristic in motion data of the at least two devices is implemented as determining, by the first device, the quantity of steps of the user according to shock vibration signal data in the motion data of the at least two devices, where when the user walks, there is corresponding shock vibration signal data in the motion data of the at least two devices in a same step counting period, and the corresponding shock vibration signal data in the motion data of the at least two devices are the same or similar.

With reference to the first possible implementation of the first aspect, in a third possible implementation, determining, by the first device, the quantity of steps of the user according to a same or similar walking characteristic in motion data of the at least two devices is implemented as determining, by the first device, the quantity of steps of the user according to slow-change signal data in the motion data of the at least two devices, where when the user walks, there is corresponding slow-change signal data in the motion data of the at least two devices in a same step counting period, and the corresponding slow-change signal data in the motion data of the at least two devices are the same or similar.

With reference to the first possible implementation of the first aspect, in a fourth possible implementation, determining, by the first device, the quantity of steps of the user according to a same or similar walking characteristic in motion data of the at least two devices is implemented as converting, by the first device, the motion data of the at least two devices from time-domain data to frequency-domain data, and determining, by the first device, the quantity of steps of the user according to a characteristic of the converted-to frequency-domain data, where when the user walks, frequency-domain data converted from motion data of the at least two devices in a same step counting period have a same or similar characteristic.

With reference to the first aspect, in a fifth possible implementation, determining, by the first device, a quantity of steps of the user according to the step counting data of the at least two devices is implemented as determining, by the first device, that the quantity of steps of the user is zero if step counting data of at least one device in the step counting data of the at least two devices meets a zero step counting condition.

With reference to the first aspect, in a sixth possible implementation, determining, by the first device, a quantity of steps of the user according to the step counting data of the at least two devices is implemented as determining, by the first device, a correlation coefficient of motion data of the at least two devices, and determining, by the first device, that the quantity of steps of the user is zero if a correlation coefficient of motion data of any two devices in the motion data of the at least two devices is less than a cross-correlation threshold.

With reference to any one of the first aspect, or the first possible implementation of the first aspect to the sixth possible implementation of the first aspect, in a seventh possible implementation, obtaining, by a first device, step counting data of at least two devices carried by a same user is implemented as receiving, by the first device, step counting data directly sent by the at least two devices.

With reference to any one of the first aspect, or the first possible implementation of the first aspect to the sixth possible implementation of the first aspect, in an eighth possible implementation, obtaining, by a first device, step counting data of at least two devices carried by a same user is implemented as receiving, by the first device, step counting data sent by the at least two devices according to a step counting data obtaining request of the first device.

With reference to any one of the first aspect, or the first possible implementation of the first aspect to the eighth possible implementation of the first aspect, in a ninth possible implementation, the method further includes obtaining, by the first device, position information of multiple devices carried by the same user, and obtaining, by the first device according to the position information of the multiple devices, step counting data from at least two devices located at different limb parts or positions of the user.

A second aspect provides a step counting device management method, including sending, by a first device, a collaborative step counting request on a network accessed by the first device, where the collaborative step counting request is used to request a step counting device of a same user on the network to participate in collaborative step counting for the user, and the user of the step counting device is also a user of the first device, receiving, by the first device, a response of at least one of the step counting device to the collaborative step counting request, and determining, by the first device according to the response of the at least one step counting device to the collaborative step counting request, a step counting device that participates in the collaborative step counting.

With reference to the second aspect, in a first possible implementation, the response of the step counting device to the collaborative step counting request carries position information of the step counting device, and the first device is the step counting device that participates in the collaborative step counting, and determining, by the first device according to the response of the at least one step counting device to the collaborative step counting request, a step counting device that participates in the collaborative step counting is implemented as choosing, by the first device according to position information of the at least one step counting device, N step counting devices from the at least one step counting device as the step counting device that participates in the collaborative step counting, where N is an integer greater than or equal to 1, positions of the N step counting devices are different from a position of the first device, and when N is greater than 1, the N step counting devices are located at different limb parts or positions of the user.

With reference to the second aspect, in a second possible implementation, the response of the step counting device to the collaborative step counting request carries position information of the step counting device, and the first device is not the step counting device that participates in the collaborative step counting, and determining, by the first device according to the response of the at least one step counting device to the collaborative step counting request, a step counting device that participates in the collaborative step counting is implemented as choosing, by the first device according to position information of the at least one step counting device, N step counting devices from the at least one step counting device as the step counting device that participates in the collaborative step counting when the at least one step counting device is multiple step counting devices, where N is an integer greater than 1, and the N step counting devices are located at different limb parts or positions of the user.

With reference to the second aspect, in a third possible implementation, the response of the step counting device to the collaborative step counting request carries a performance parameter of the step counting device, and determining, by the first device according to the response of the at least one step counting device to the collaborative step counting request, a step counting device that participates in the collaborative step counting is implemented as choosing, by the first device according to a performance parameter of the at least one step counting device, N step counting devices from the at least one step counting device as the step counting device that participates in the collaborative step counting, where the response of the step counting device to the collaborative step counting request carries the performance parameter of the step counting device, N is an integer greater than or equal to 1, and the N step counting devices are N step counting devices with better performance parameters of the at least one step counting device.

With reference to the third possible implementation of the second aspect, in a fourth possible implementation, the method further includes choosing, by the first device, M step counting devices from the at least one step counting device as candidate collaborative step counting devices according to the performance parameter of the at least one step counting device, where the M step counting devices are M step counting devices with relatively good performance parameters of the at least one step counting device excluding the N step counting devices, the candidate collaborative step counting devices are step counting devices that have the capability to perform collaborative step counting but do not participate in the collaborative step counting, and M is an integer greater than or equal to 1.

With reference to the fourth possible implementation of the second aspect, in a fifth possible implementation, the method further includes substituting, by the first device, the second device for the third device to participate in the collaborative step counting when a performance parameter of a second device of the candidate collaborative step counting devices indicates better performance than a performance parameter of a third device of the step counting devices that participate in the collaborative step counting does.

With reference to any one of the second aspect, or the first possible implementation of the second aspect to the fifth possible implementation of the second aspect, in a sixth possible implementation, the performance parameter includes a quantity of electricity and a calculation capability, and the method further includes choosing, by the first device, a step counting device that has a largest quantity of electricity and/or a strongest calculation capability and that is of the step counting device participating in the collaborative step counting, as a calculation device according to a quantity of electricity and/or a calculation capability of the at least one step counting device, where the calculation device is a device that is configured to calculate a step counting result according to multiple pieces of step counting data and that is of the step counting device participating in the collaborative step counting.

With reference to the sixth possible implementation of the second aspect, in a seventh possible implementation, the method further includes choosing, by the first device, a step counting device with a relatively large quantity of electricity and/or a relatively strong calculation capability as a candidate calculation device according to the quantity of electricity and/or the calculation capability of the at least one step counting device, where the candidate calculation device is a device that is capable of substituting for the calculation device to calculate the step counting result according to the multiple pieces of step counting data.

With reference to the sixth possible implementation of the second aspect, in a seventh possible implementation, the method further includes substituting, by the first device, the fourth device for the calculation device if a performance parameter of a fourth device of the candidate calculation device indicates better performance than that of the calculation device does.

A third aspect provides a step counting device, where the step counting device includes an obtaining unit configured to obtain step counting data of at least two devices carried by a same user, where the step counting device is one of the at least two devices, or the step counting device is different from the at least two devices, and a determining unit configured to determine a quantity of steps of the user according to the step counting data of the at least two devices.

With reference to the third aspect, in a first possible implementation, the determining unit is further configured to determine the quantity of steps of the user according to a same or similar walking characteristic in motion data of the at least two devices.

With reference to the first possible implementation of the third aspect, in a second possible implementation, in a process in which the determining unit is configured to determine the quantity of steps of the user according to a same or similar walking characteristic in motion data of the at least two devices, the determining unit is further configured to determine the quantity of steps of the user according to shock vibration signal data in the motion data of the at least two devices, where when the user walks, there is corresponding shock vibration signal data in the motion data of the at least two devices in a same step counting period, and the corresponding shock vibration signal data in the motion data of the at least two devices are the same or similar.

With reference to the first possible implementation of the third aspect, in a third possible implementation, in a process in which the determining unit is configured to determine the quantity of steps of the user according to a same or similar walking characteristic in motion data of the at least two devices, the determining unit is further configured to determine the quantity of steps of the user according to slow-change signal data in the motion data of the at least two devices, where when the user walks, there is corresponding slow-change signal data in the motion data of the at least two devices in a same step counting period, and the corresponding slow-change signal data in the motion data of the at least two devices are the same or similar.

With reference to the first possible implementation of the third aspect, in a fourth possible implementation, in a process in which the determining unit is configured to determine the quantity of steps of the user according to a same or similar walking characteristic in motion data of the at least two devices, the determining unit is further configured to convert the motion data of the at least two devices from time-domain data to frequency-domain data, and determine the quantity of steps of the user according to a characteristic of the converted-to frequency-domain data, where when the user walks, frequency-domain data converted from motion data of the at least two devices in a same step counting period have a same or similar characteristic.

With reference to the third aspect, in a fifth possible implementation, the determining unit is further configured to determine that the quantity of steps of the user is zero if step counting data of at least one device in the step counting data of the at least two devices meets a zero step counting condition.

With reference to the third aspect, in a sixth possible implementation, the determining unit is further configured to determine a correlation coefficient of motion data of the at least two devices, and determine that the quantity of steps of the user is zero if a correlation coefficient of motion data of any two devices in the motion data of the at least two devices is less than a cross-correlation threshold.

With reference to any one of the third aspect, or the first possible implementation of the third aspect to the sixth possible implementation of the third aspect, in a seventh possible implementation, the obtaining unit is further configured to receive step counting data directly sent by the at least two devices.

With reference to any one of the third aspect, or the first possible implementation of the third aspect to the sixth possible implementation of the third aspect, in an eighth possible implementation, the obtaining unit is further configured to receive step counting data sent by the at least two devices according to a step counting data obtaining request of the step counting device.

With reference to any one of the third aspect, or the first possible implementation of the third aspect to the eighth possible implementation of the third aspect, in a ninth possible implementation, the obtaining unit is further configured to obtain position information of multiple devices carried by the same user. The step counting device further includes a choosing unit, and the choosing unit is configured to obtain, according to the position information of the multiple devices, step counting data from at least two devices located at different limb parts or positions of the user.

A fourth aspect provides a management device, where the management device includes a sending unit configured to send a collaborative step counting request on a network accessed by the management device, where the collaborative step counting request is used to request a step counting device of a same user on the network to participate in collaborative step counting for a user on which the management device is located, and the user of the step counting device is also the user of the management device, a receiving unit configured to receive a response of at least one of the step counting device to the collaborative step counting request, and a management unit configured to determine, according to the response of the at least one step counting device to the collaborative step counting request, a step counting device that participates in the collaborative step counting.

With reference to the fourth aspect, in a first possible implementation, the response of the step counting device to the collaborative step counting request carries position information of the step counting device, the management device is the step counting device that participates in the collaborative step counting, and the management unit is further configured to choose, according to position information of the at least one step counting device, N step counting devices from the at least one step counting device as the step counting device that participates in the collaborative step counting, where N is an integer greater than or equal to 1, positions of the N step counting devices are different from a position of the management device, and when N is greater than 1, the N step counting devices are located at different limb parts or positions of the user.

With reference to the fourth aspect, in a second possible implementation, the response of the step counting device to the collaborative step counting request carries position information of the step counting device, the management device is not the step counting device that participates in the collaborative step counting, and the management unit is further configured to choose, according to position information of the at least one step counting device, N step counting devices from the at least one step counting device as the step counting device that participates in the collaborative step counting when the at least one step counting device is multiple step counting devices, where N is an integer greater than 1, and the N step counting devices are located at different limb parts or positions of the user.

With reference to the fourth aspect, in a third possible implementation, the response of the step counting device to the collaborative step counting request carries a performance parameter of the step counting device, and the management unit is further configured to choose, according to a performance parameter of the at least one step counting device, N step counting devices from the at least one step counting device as the step counting device that participates in the collaborative step counting, where the response of the step counting device to the collaborative step counting request carries the performance parameter of the step counting device, N is an integer greater than or equal to 1, and the N step counting devices are N step counting devices with better performance parameters of the at least one step counting device.

With reference to the third possible implementation of the fourth aspect, in a fourth possible implementation, the management unit is further configured to choose M step counting devices from the at least one step counting device as candidate collaborative step counting devices according to the performance parameter of the at least one step counting device, where the M step counting devices are M step counting devices with relatively good performance parameters of the at least one step counting device excluding the N step counting devices, the candidate collaborative step counting devices are step counting devices that have the capability to perform collaborative step counting but do not participate in the collaborative step counting, and M is an integer greater than or equal to 1.

With reference to the fourth possible implementation of the fourth aspect, in a fifth possible implementation, the management unit is further configured to substitute the second device for the third device to participate in the collaborative step counting when a performance parameter of a second device of the candidate collaborative step counting devices indicates better performance than a performance parameter of a third device of the step counting devices that participate in the collaborative step counting does.

With reference to any one of the fourth aspect, or the first possible implementation of the fourth aspect to the fifth possible implementation of the fourth aspect, in a sixth possible implementation, the performance parameter includes a quantity of electricity and a calculation capability, and the management unit is further configured to choose a step counting device that has a largest quantity of electricity and/or a strongest calculation capability and that is of the step counting device participating in the collaborative step counting, as a calculation device according to a quantity of electricity and/or a calculation capability of the at least one step counting device, where the calculation device is a device that is configured to calculate a step counting result according to multiple pieces of step counting data and that is of the step counting device participating in the collaborative step counting.

With reference to the sixth possible implementation of the fourth aspect, in a seventh possible implementation, the management unit is further configured to choose a step counting device with a relatively large quantity of electricity and/or a relatively strong calculation capability as a candidate calculation device according to the quantity of electricity and/or the calculation capability of the at least one step counting device, where the candidate calculation device is a device that is capable of substituting for the calculation device and is configured to calculate the step counting result according to the multiple pieces of step counting data.

With reference to the seventh possible implementation of the fourth aspect, in an eighth possible implementation, the management unit is further configured to substitute the fourth device for the calculation device if a performance parameter of a fourth device of the candidate calculation device indicates better performance than that of the calculation device does.

A fifth aspect provides a mobile terminal, where the mobile terminal includes a memory, a channel interface, and a processor, where the memory is configured to store a program of the mobile terminal, the processor is configured to execute the program stored in the memory, and is further configured to perform the operations of obtaining, using the channel interface, step counting data of at least two step counting terminals carried by a same user, where the mobile terminal is one of the at least two step counting terminals, or the mobile terminal is different from the at least two step counting terminals, and determining a quantity of steps of the user according to the step counting data of the at least two terminals.

With reference to the fifth aspect, in a first possible implementation, in a process in which the processor is configured to determine a quantity of steps of the user according to the step counting data of the at least two step counting terminals, the processor is further configured to determine the quantity of steps of the user according to a same or similar walking characteristic in motion data of the at least two step counting terminals.

With reference to the first possible implementation of the fifth aspect, in a second possible implementation, in a process in which the processor is configured to determine the quantity of steps of the user according to a same or similar walking characteristic in motion data of the at least two step counting terminals, the processor is further configured to determine the quantity of steps of the user according to shock vibration signal data in the motion data of the at least two step counting terminals, where when the user walks, there is corresponding shock vibration signal data in the motion data of the at least two step counting terminals in a same step counting period, and the corresponding shock vibration signal data in the motion data of the at least two step counting terminals are the same or similar.

With reference to the first possible implementation of the fifth aspect, in a third possible implementation, in a process of determining the quantity of steps of the user according to a same or similar walking characteristic in motion data of the at least two step counting terminals, the processor further performs determining the quantity of steps of the user according to slow-change signal data in the motion data of the at least two step counting terminals, where when the user walks, there is corresponding slow-change signal data in the motion data of the at least two step counting terminals in a same step counting period, and the corresponding slow-change signal data in the motion data of the at least two step counting terminals are the same or similar.

With reference to the first possible implementation of the third aspect, in a fourth possible implementation, in a process of determining the quantity of steps of the user according to a same or similar walking characteristic in motion data of the at least two step counting terminals, the processor further performs converting the motion data of the at least two step counting terminals from time-domain data to frequency-domain data, and determining the quantity of steps of the user according to a characteristic of the converted-to frequency-domain data, where when the user walks, frequency-domain data converted from motion data of the at least two step counting terminals in a same step counting period have a same or similar characteristic.

With reference to the fifth aspect, in a fifth possible implementation, in a process in which the processor is configured to determine a quantity of steps of the user according to the step counting data of the at least two step counting terminals, the processor is further configured to determine that the quantity of steps of the user is zero if step counting data of at least one step counting terminal in the step counting data of the at least two step counting terminals meets a zero step counting condition.

With reference to the fifth aspect, in a sixth possible implementation, in a process in which the processor is configured to determine a quantity of steps of the user according to the step counting data of the at least two step counting terminals, the processor is further configured to determine a correlation coefficient of motion data of the at least two step counting terminals, and determine that the quantity of steps of the user is zero if a correlation coefficient of motion data of any two step counting terminals in the motion data of the at least two step counting terminals is less than a cross-correlation threshold.

With reference to any one of the fifth aspect, or the first possible implementation of the fifth aspect to the sixth possible implementation of the fifth aspect, in a seventh possible implementation, in a process in which the processor is configured to obtain, using the channel interface, step counting data of at least two step counting terminals carried by a same user, the processor is further configured to receive, using the channel interface, step counting data directly sent by the at least two step counting terminals.

With reference to any one of the fifth aspect, or the first possible implementation of the fifth aspect to the sixth possible implementation of the fifth aspect, in an eighth possible implementation, in a process in which the processor is configured to obtain, using the channel interface, step counting data of at least two step counting terminals carried by a same user, the processor is further configured to receive, using the channel interface, step counting data sent by the at least two step counting terminals according to a step counting data obtaining request of the mobile terminal.

With reference to any one of the fifth aspect, or the first possible implementation of the fifth aspect to the eighth possible implementation of the fifth aspect, in a ninth possible implementation, the processor is further configured to obtain position information of multiple step counting terminals carried by the same user, and obtain step counting data from at least two devices located at different limb parts or positions of the user.

A sixth aspect provides a mobile terminal, where the mobile terminal includes a memory, a channel interface, and a processor, where the memory is configured to store a program of the mobile terminal, the processor is configured to execute the program stored in the memory, and is further configured to perform the operations of sending, using the channel interface, a collaborative step counting request on a network accessed by the mobile terminal, where the collaborative step counting request is used to request a step counting terminal of a same user on the network to participate in collaborative step counting for the user, and the user of the step counting terminal is also a user of the mobile terminal, receiving a response of at least one of the multiple step counting devices to the collaborative step counting request using the channel interface, and determining, according to the response of the at least one step counting device to the collaborative step counting request, a step counting device that participates in the collaborative step counting.

With reference to the sixth aspect, in a first possible implementation, the response of the step counting terminal to the collaborative step counting request carries position information of the step counting terminal, where the mobile terminal is the step counting terminal that participates in the collaborative step counting, and in a process in which the processor is configured to determine, according to the response of the at least one step counting terminal to the collaborative step counting request, a step counting terminal that participates in the collaborative step counting, the processor is further configured to choose, according to position information of the at least one step counting terminal, N step counting terminals from the at least one step counting terminal as the step counting terminal that participates in the collaborative step counting, where N is an integer greater than or equal to 1, positions of the N step counting terminals are different from a position of the mobile terminal, and when N is greater than 1, the N step counting terminals are located at different limb parts or positions of the user.

With reference to the sixth aspect, in a second possible implementation, the response of the step counting terminal to the collaborative step counting request carries position information of the step counting terminal, where the mobile terminal is not the step counting terminal that participates in the collaborative step counting, and in a process in which the processor is configured to determine, according to the response of the at least one step counting terminal to the collaborative step counting request, a step counting terminal that participates in the collaborative step counting, the processor is further configured to choose, according to position information of the at least one step counting terminal, N step counting terminals from the at least one step counting terminal as the step counting terminal that participates in the collaborative step counting when the at least one step counting device is multiple step counting devices, where N is an integer greater than 1, and the N step counting terminals are located at different limb parts or positions of the user.

With reference to the sixth aspect, in a third possible implementation, the response of the step counting terminal to the collaborative step counting request carries a performance parameter of the step counting terminal, and in a process in which the processor is configured to determine, according to the response of the at least one step counting terminal to the collaborative step counting request, a step counting terminal that participates in the collaborative step counting, the processor is further configured to choose, according to a performance parameter of the at least one step counting terminal, N step counting terminals from the at least one step counting terminal as the step counting terminal that participates in the collaborative step counting, where the response of the step counting terminal to the collaborative step counting request carries the performance parameter of the step counting terminal, N is an integer greater than or equal to 1, and the N step counting terminals are N step counting terminals with better performance parameters of the at least one step counting terminal.

With reference to the third possible implementation of the sixth aspect, in a fourth possible implementation, the processor is further configured to choose M step counting terminals from the at least one step counting terminal as candidate collaborative step counting terminals according to the performance parameter of the at least one step counting terminal, where the M step counting terminals are M step counting terminals with relatively good performance parameters of the at least one step counting terminal excluding the N step counting terminals, the candidate collaborative step counting terminals are step counting terminals that have the capability to perform collaborative step counting but do not participate in the collaborative step counting, and M is an integer greater than or equal to 1.

With reference to the fourth possible implementation of the sixth aspect, in a fifth possible implementation, the processor is further configured to substitute the second step counting terminal for the third step counting terminal to participate in the collaborative step counting when a performance parameter of a second step counting terminal of the candidate collaborative step counting terminals indicates better performance than a performance parameter of a third step counting terminal of the step counting terminals that participate in the collaborative step counting does.

With reference to any one of the sixth aspect, or the first possible implementation of the sixth aspect to the fifth possible implementation of the sixth aspect, in a sixth possible implementation, the performance parameter includes a quantity of electricity and a calculation capability, and the processor is further configured to choose a step counting terminal that has a largest quantity of electricity and/or a strongest calculation capability and that is of the step counting terminal participating in the collaborative step counting, as a calculation terminal according to a quantity of electricity and/or a calculation capability of the at least one step counting terminal, where the calculation terminal is a step counting terminal that is configured to calculate a step counting result according to multiple pieces of step counting data and that is of the step counting terminal participating in the collaborative step counting.

With reference to the sixth possible implementation of the sixth aspect, in a seventh possible implementation, the processor is further configured to choose a step counting terminal with a relatively large quantity of electricity and/or a relatively strong calculation capability as a candidate calculation terminal according to the quantity of electricity and/or the calculation capability of the at least one step counting terminal, where the candidate calculation terminal is a step counting terminal that is capable of substituting for the calculation terminal and is configured to calculate the step counting result according to the multiple pieces of step counting data.

With reference to the seventh possible implementation of the sixth aspect, in an eighth possible implementation, the processor is further configured to substitute the fourth terminal for the calculation terminal if a performance parameter of a fourth terminal of the candidate calculation terminal indicates better performance than that of the calculation terminal does.

In the embodiments of the present disclosure, the first device determines the quantity of steps of the user according to the step counting data of the at least two devices of the step counting devices that participate in the collaborative step counting in order to avoid a step counting error caused when a single device performs step counting, thereby improving step counting accuracy.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
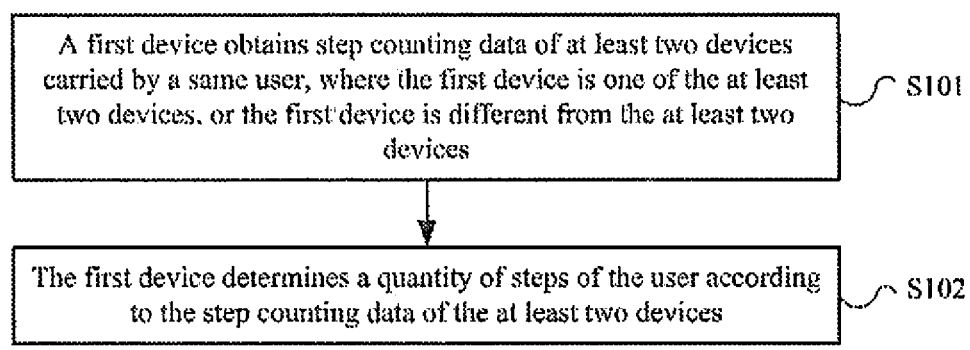
FIG. 1 illustrates a flowchart of a step counting method according to an embodiment of the present disclosure.

FIG. 1 illustrates a flowchart of a step counting method according to an embodiment of the present disclosure. The method in FIG. 1 is executed by a step counting device. The step counting device may be a smart band, a mobile phone, or another mobile terminal. The method includes the following steps.

Step S101: A first device obtains step counting data of at least two devices carried by a same user, where the first device is one of the at least two devices, or the first device is different from the at least two devices.

It can be understood that the first device may obtain step counting data of at least two devices including the first device. For example, when the first device has a step counting function, the first device obtains step counting data of the first device and obtains step counting data of at least one device.

Alternatively, the first device may obtain step counting data of at least two devices other than the first device. For example, when the first device does not have a step counting function, or has a step counting function but does not participate in step counting, the first device needs to obtain step counting data from another device, and in this case, the first device needs to obtain step counting data of the at least two devices other than the first device.

In this case, the first device and the other device may be carried by different users, or may be carried by a same user.

It should be understood that in this embodiment of the present disclosure, the step counting data of the at least two devices obtained by the first device is from step counting devices that are worn or carried by a same user. A scenario in which the obtained step counting data is from step counting devices on bodies of different users does not fall within a scope to be resolved in this embodiment of the present disclosure, and details are not described herein in this embodiment of the present disclosure.

In this embodiment of the present disclosure, the step counting data includes motion data, step quantity result data that a quantity of steps obtained according to the motion data is zero, and data that the quantity of steps is zero.

The motion data includes a motion signal that is generated by a step counting device when a user moves and a time stamp corresponding to the motion signal.

When the step counting data is the motion data, the first device may perform comparison, analysis, and calculation according to motion data of the at least two devices in order to determine a quantity of steps of the user. It can be understood that in collaborative step counting for a same user, the first device is configured to calculate step counting data of the user. The first device has a calculation capability, and may be referred to as a calculation device in the collaborative step counting. Another device that participates in the collaborative step counting has at least an independent step counting capability, and may be referred to as an auxiliary device in the collaborative step counting.

Step quantity result data that is obtained by the step counting device according to a group of motion data (that is, motion data that is measured by a step counting device in a period) includes two cases, a step quantity result is zero, and a step quantity result is not zero. When a step quantity result of a user that is obtained by the step counting device according to the motion data is zero, the motion data meets a zero step counting condition.

It should be noted that if the step counting data is data that a quantity of steps is zero, or the motion data meets the zero step counting condition, it may be considered that the step counting data meets the zero step counting condition.

The step counting device may determine whether the motion data meets the zero step counting condition using multiple methods, such as a pattern recognition algorithm and a threshold method. For specific implementation, reference may be made to other approaches. In the present disclosure, the threshold method is only used as an example for description.

In the threshold method, the step counting device may compare an amplitude value of a motion signal with a static threshold in order to determine whether a user carrying the step counting device is in a static state, or to determine whether a quantity of steps of the user is zero. If the amplitude value of the motion signal is continuously less than the static threshold, it is considered that the user is in the static state in this period, a step quantity result obtained according to motion data is zero, and the motion data meets the zero step counting condition. Otherwise, if the motion signal exceeds the threshold and fluctuates relatively greatly, it is considered that the user may walk in this period, and a step quantity result is not necessarily zero.

Figure 2:
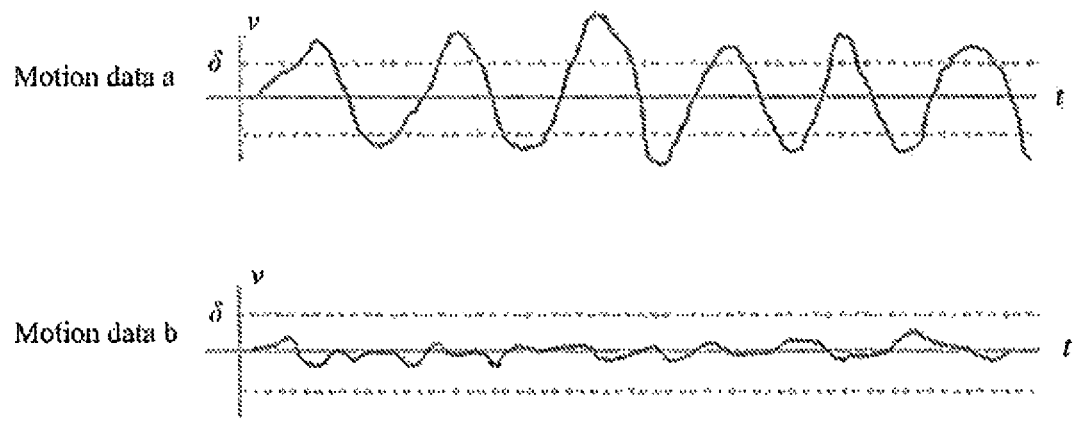
FIG. 2 illustrates schematic diagrams of time-amplitude curves of motion data according to an embodiment of the present disclosure.

It is assumed that the user sits and works, with a mobile phone in a pocket of trousers, a smart band on the wrist, and both hands typing on a keyboard. Step counting data collected by the mobile phone and the smart band is motion signals with time stamps. In this case, motion data collected by the mobile phone and the smart band is shown in FIG. 2. FIG. 2 illustrates schematic diagrams of time-amplitude curves of the motion data according to an embodiment of the present disclosure. Motion data a is motion data that is collected by the smart band, motion data b is motion data that is collected by the mobile phone, v represents an amplitude value of a motion signal in motion data, t represents a time stamp of a motion signal in motion data, and $\delta$ represents a static threshold of motion data. It is assumed that coordinates (v1, t1) represent a point on a curve that is corresponding to the motion data a, and the coordinates (v1, t1) represent that an amplitude value of a motion signal in the motion data a at a moment t1 is v1.

If an amplitude value of a motion signal in motion data is between $+\delta$ and $-\delta$, it may be determined using the threshold method that the motion data meets the zero step counting condition, that is, a quantity of steps of the user is zero. For example, in FIG. 2, a fluctuation range of an amplitude value of the motion data b keeps within the static threshold $\delta$. In this case, it can be determined according to a correlation relationship between the motion data b and the static threshold $\delta$ that the user is in a static state, that is, the motion data b meets the zero step counting condition. Therefore, it can be determined according to the motion data of the mobile phone that the user carrying the mobile phone is in the static state, or a step quantity result is zero.

It should be noted that a method of obtaining, by the first device, step counting data of at least two devices carried by a same user includes that the first device receives step counting data directly sent by the at least two devices, or the first device receives step counting data sent by the at least two devices according to a step counting data obtaining request of the first device.

Step S102: The first device determines a quantity of steps of the user according to the step counting data of the at least two devices.

In this embodiment of the present disclosure, to calculate a quantity of steps, the first device needs step counting data of at least two devices. Therefore, determining a quantity of steps of the user according to the step counting data of the at least two devices is also referred to as collaborative step counting of the at least two devices. Certainly, step counting devices that participate in the collaborative step counting are carried or worn by a same user. The step counting data obtained by the first device may include step counting data of all devices that participate in the collaborative step counting, or step counting data of several of all the devices.

Determining a quantity of steps of the user includes two cases, determining that the quantity of steps of the user is zero, and determining that the quantity of steps is not zero, that is, determining a specific quantity of steps.

Determining that the quantity of steps of the user is zero may include, for example if step counting data of at least one device in the step counting data of the at least two devices meets the zero step counting condition, determining, by the first device, that the quantity of steps of the user is zero.

That is, if step counting data of one of the step counting devices that participate in the collaborative step counting is data that a quantity of steps is zero or is motion data that meets the zero step counting condition, the first device determines that a quantity of counted steps of the user is zero.

It can be further learned from FIG. 2 that a fluctuation range of an amplitude value of the motion data a exceeds the static threshold δ, and therefore, the smart band determines, according to a relative relationship between the motion data a and the static threshold δ, that the user may be walking, and a step counting result is not necessarily zero. That is, the motion data a does not meet the zero step counting condition. However, the motion data b in FIG. 2 indicates that the motion data collected by the mobile phone meets the zero step counting condition. Therefore, when the smart band and the mobile phone collaboratively count steps, it is determined according to the motion data a of the smart band and the motion data b of the mobile phone that the quantity of steps of the user is zero.

Determining that the quantity of steps of the user is zero may further include, for example determining, by the first device, a cross-correlation coefficient of the motion data of the at least two devices, and determining, by the first device, that the quantity of steps of the user is zero if a cross-correlation coefficient of motion data of any two devices in the motion data of the at least two devices is less than a cross-correlation threshold.

It should be understood that an amplitude value of a motion signal in a period is recorded in motion data. That is, each group of motion data is used to represent a motion signal in a period. Generally, a cross-correlation function may be used to detect a cross-correlation coefficient of two groups of motion data in order to determine whether there are motion signals in a same pace in motion signals represented by the two groups of motion data. A greater cross-correlation coefficient indicates that there are more motion signal components in a same pace in the two groups of motion data. The cross-correlation coefficient being zero indicates that the motion signals in the two groups of motion data are completely independent, and there is no signal in a same pace.

It should be understood that if a cross-correlation coefficient of two groups of motion data (which are from two different step counting devices, respectively) that are recorded for a same user is less than the cross-correlation coefficient, it is considered that motion signals recorded in the two groups of motion data are irrelevant, and there is no motion signal component or only a few of motion signal components in a same pace in the motion signals recorded in the two groups of motion data. Therefore, it can be determined that the quantity of steps of the user is zero.

Figure 3:
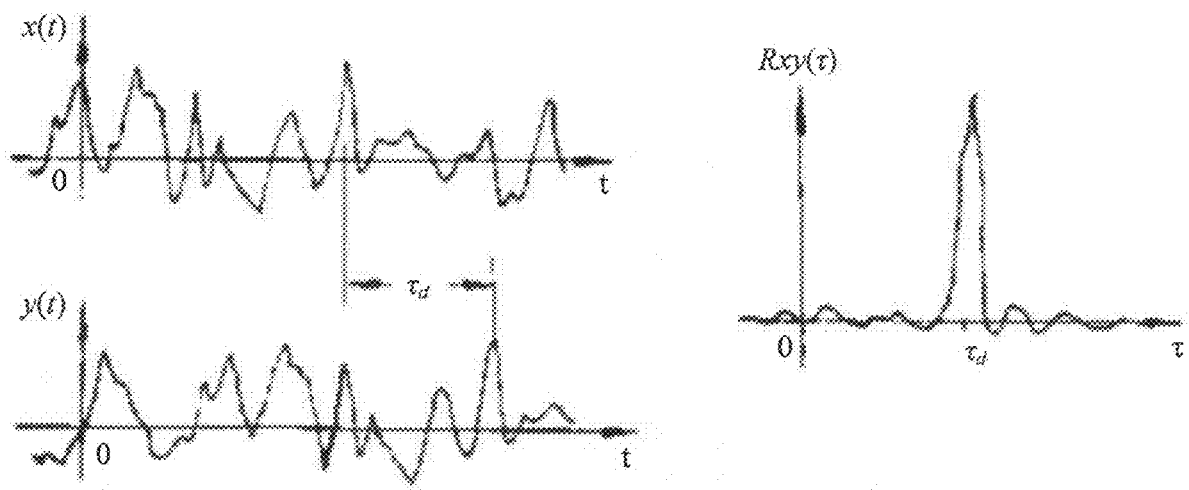
FIG. 3 illustrates a schematic diagram of a cross-correlation function curve according to an embodiment of the present disclosure.

Before the cross-correlation coefficient of the two groups of motion data is determined, time synchronization first needs to be performed on the motion signals of the two groups of motion data. FIG. 3 illustrates a schematic diagram of a cross-correlation function curve according to an embodiment of the present disclosure. In FIG. 3, functions x(t) and y(t) shown in the left graphs represent two groups of motion data, a function $R_{xy}(\tau)$ shown in the right graph represents a cross-correlation function of the two groups of motion data x(t) and y(t), and τ represents a time offset between motion signals of the two groups of motion data. For a method of performing the time synchronization on the motion signals of the two groups of motion data in this embodiment of the present disclosure, reference may be made to the function $R_{xy}(\tau)$ shown in the right graph in FIG. 3. Functions x(t) and y(t) are used to represent motion data of two different step counting devices for a same user in a period, respectively. It is assumed that when a value of τ in the function $R_{xy}(\tau)$ is $\tau_d$, an absolute value of $R_{xy}(\tau)$ is a largest value, and it may be considered that a moment t of the motion data x(t) and a moment $t+\tau_d$ of the motion data y(t) represent a same moment. According to a location of the largest value of the cross-correlation function, the time synchronization may be performed on the motion signals in the two groups of motion data. A method of performing time synchronization on motion signals of multiple groups of motion data may be obtained by synchronizing each two of the multiple groups of motion data. Certainly, another manner may be used to perform the time synchronization on the motion signals of the multiple groups of motion data.

After the time synchronization is performed on the motion signals of the two groups of motion data, whether the two groups of motion data are correlative may be determined according to the cross-correlation coefficient of the two groups of motion data, that is, whether there are more motion signal components in a same pace in the two groups of motion data is determined.

A form of the cross-correlation function is as follows:

$$R_{xy}(\tau) = \lim_{T \to \infty} \frac{1}{T} \int_0^T x(t)y(t+\tau)dt,$$

where x(t) and y(t+τ) represent two groups of different motion data, respectively, and $R_{xy}(\tau)$ represents a function of a cross-correlation coefficient when a time difference between the two groups of motion data is τ.

The following cross-correlation coefficient $\rho_{xy}(\tau)$ may be obtained according to the foregoing cross-correlation function:

$$\rho_{xy}(\tau) = \frac{R_{xy}(\tau) - \mu_x \mu_y}{\sigma_x \sigma_y},$$

where $\mu_x$ represents an average value of the motion data x(t), $\mu_y$ represents an average value of the motion data y(t+τ), $\sigma_x$ represents a standard deviation of the motion data x(t), and $\sigma_y$ represents a standard deviation of the motion data y(t+τ).

The cross-correlation coefficient $\rho_{xy}(\tau)$ has the following physical meaning:

$$|\rho_{xy}(\tau)| \leq 1, \begin{cases} 0 < \rho_{xy}(\tau) \leq 1, \text{ Positive correlation} \\ -1 \leq \rho_{xy}(\tau) < 0, \text{ Negative correlation}, \\ \rho_{xy}(\tau) = 0, \text{ Irrelevant} \end{cases}$$

where a $|\rho_{xy}(\tau)|$ closer to 1 indicates a higher correlation between motion signals recorded in two groups of motion data, respectively, and a $|\rho_{xy}(\tau)|$ closer to 0 indicates a lower correlation between motion signals recorded in two groups of motion data, respectively.

If the cross-correlation coefficient $\rho_{xy}(\tau)$ of the two groups of motion data is less than the cross-correlation threshold, the first device may determine that the quantity of steps of the user is zero. It should be understood that the cross-correlation threshold is a value whose absolute value is greater than 0 and less than 1, and the value of the cross-correlation threshold may be generally calculated according to an empirical formula. For example, in FIG. 2, if the factor that the motion data b meets the zero step counting condition is not considered, it can be learned according to the curve graphs of the motion data a and the motion data b that the motion data a and the motion data b have extremely low similarity, and it can be calculated according to a formula that a cross-correlation coefficient of the motion data a and the motion data b is approximately zero. Therefore, it can be easily determined that the cross-correlation coefficient of the motion data a and the motion data b is obviously less than the cross-correlation threshold, and in this case, it can be determined that the quantity of steps of the user carrying the smart band and the mobile phone is zero.

A method for determining that the quantity of steps of the user is not zero, that is, determining a specific quantity of steps of the user includes, for example determining, by the first device, the quantity of steps of the user according to a same or similar walking characteristic in the motion data of the at least two devices.

Two devices participating in the collaborative step counting are used as an example. When there is a same or similar walking characteristic in motion data of the two devices, the quantity of steps of the user may be determined according to the same or similar walking characteristic appearing in the motion data of the two devices.

To improve matching efficiency of a walking characteristic signal, whether there are motion signal components in a same pace (that is, the same or similar walking characteristic) in the motion data of the two devices may be first determined according to a cross-correlation coefficient of the motion data of the two devices. If the cross-correlation coefficient $\rho_{xy}(\tau)$ of the motion data of the two devices is less than the cross-correlation threshold, it may be considered that the two devices have no motion signal component in the same pace or have a few of motion signal components in the same pace, and the first device may directly determine that the quantity of steps of the user is zero. If the cross-correlation coefficient $\rho_{xy}(\tau)$ of the motion data of the two devices is greater than the cross-correlation threshold, the first device may determine the quantity of steps of the user according to the same or similar walking characteristic appearing in the motion data of the two devices.

Certainly, it should be understood that before the quantity of steps of the user is determined according to the same or similar walking characteristic appearing in the motion data of the two devices, correlation analysis may be or may not be performed on the motion data of the two devices.

The following shows several methods for determining the quantity of steps of the user according to the same or similar walking characteristic appearing in the motion data of the two devices.

A method for determining the quantity of steps of the user is, for example determining, by the first device, the quantity of steps of the user according to shock vibration signal data in the motion data of the at least two devices. When the user walks, there is corresponding shock vibration signal data in the motion data of the at least two devices in a same step counting period, and the corresponding shock vibration signal data in the motion data of the at least two devices are the same or similar.

It is assumed that a smart band is worn by the user on the wrist, and a mobile phone is put in a pocket of trousers. When the user takes a step, a shock vibration signal is generated, and the signal spreads throughout the body. Regardless of whether a limb performs another action, a sensing signal includes the shock vibration signal, and shock vibrations of two signals of the smart band and the mobile phone have a same pace. For a sensing signal without another limb action, the shock vibration signal is displayed very clearly. However, for a sensing signal with another limb action, when a shock vibration occurs, a time-domain signal fluctuates. If two signals are synchronous, a walking shock vibration signal may be extracted by detecting a matching degree of a time-domain signal fluctuation change. During walking, a shock vibration signal generated during walking is transmitted to the smart band and the mobile phone at the same time, and even if an arm is performing another action, a quantity of walking steps may be correctly recorded by matching shock vibration time characteristics of the mobile phone and the smart band.

Figure 4:
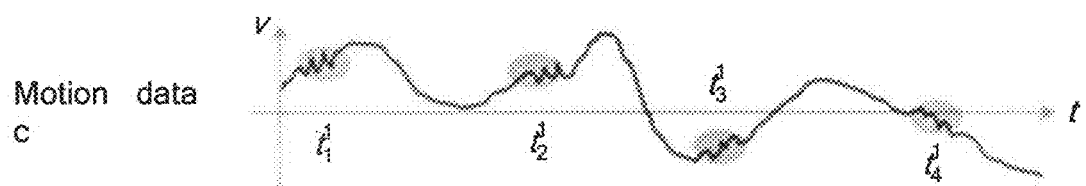
FIG. 4 illustrates schematic curve diagrams of motion data of a smart band and a mobile phone in a walking state according to an embodiment of the present disclosure.
Figure 4:
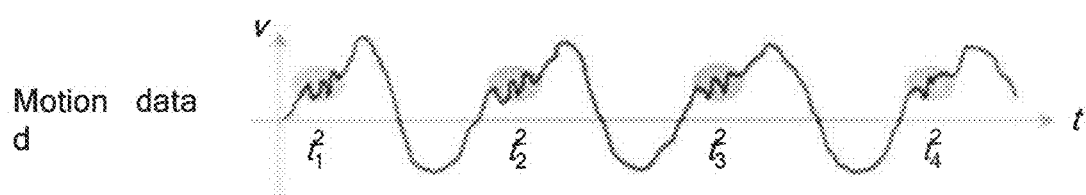

FIG. 4 illustrates schematic curve diagrams of motion data of a smart band and a mobile phone in a walking state according to an embodiment of the present disclosure. Motion data c is a motion signal collected by the smart band, and motion data d is a motion signal collected by the mobile phone. Similar to that in FIG. 2, v represents an amplitude value of a motion signal in motion data, and t represents a time stamp of a motion signal in motion data. For example, in FIG. 4, when the user walks, the smart band and the mobile phone output motion signals at the same time, and after a cross-correlation coefficient operation of a cross-correlation function is performed on two groups of motion data, a cross-correlation coefficient $\rho_{xy}(\tau)$ is obtained. It is assumed that a value of a cross-correlation threshold is $|\rho_{xy}(\tau_d)|$. If the cross-correlation coefficient $\rho_{xy}(\tau)$ is less than $|\rho_{xy}(\tau_d)|$, it indicates that the user is in a static state. If the cross-correlation coefficient $\rho_{xy}(\tau)$ is greater than $|\rho_{xy}(\tau_d)|$, it indicates that the user may be in a walking state. It can be learned from FIG. 4 that although waveforms of the smart band and the mobile phone are different, the waveforms have a similar change pace, and the cross-correlation coefficient is high. The motion data can be used for step counting.

As shown in FIG. 4, ovals on output signal curves of the smart band and the mobile phone indicate shock vibration signals that may be generated when the user walks, and the devices automatically record local time sequences of each shock vibration signal. Time point matching is performed on shock vibration time sequences of the two groups of motion data, and matched time points may be marked as one step. According to a shock vibration time characteristic matching method, it can be determined that time points $(t_1^1, t_2^1, t_3^1, t_4^1)$ of the motion data c matches time points $(t_1^2, t_2^2, t_3^2, t_4^2)$ of the motion data d, respectively. A step counting result of the motion data shown in FIG. 4 is four steps.

A method for determining the quantity of steps of the user may alternatively be, for example determining, by the first device, the quantity of steps of the user according to slow-change signal data in the motion data of the at least two devices. When the user walks, there is corresponding slow-change signal data in the motion data of the at least two devices in a same step counting period, and the corresponding slow-change signal data in the motion data of the at least two devices are the same or similar.

Figure 5:
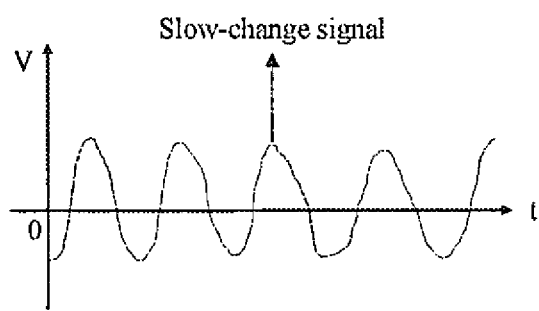
FIG. 5 illustrates a schematic curve diagram of motion data that is recorded by a wristband when an arm swings according to an embodiment of the present disclosure.

In a walking process of a user wearing a step counting device, a signal of a sensor of the step counting device includes multiple components, such as a slow-change signal component. The slow-change signal component is a remaining low-frequency signal component obtained after a high-frequency signal component is filtered out by a filter. This part of signal is mostly generated by a rhythmic swing movement made by a limb part wearing the step counting device when the user walks, for example, swing of an arm. FIG. 5 illustrates a schematic curve diagram of motion data that is recorded by a wristband when an arm swings according to an embodiment of the present disclosure. Similar to that in FIG. 2, v represents an amplitude value of a motion signal in motion data, and t represents a time stamp of a motion signal in motion data. As shown in FIG. 5, when the arm swings, slow-change signal data similar to a sine wave is generated. A slow-change signal component generated by limb swing usually keeps a same change pace with a user's walking rhythm, and therefore, is usually used as a main basis of step counting. When the user walks, in motion data recorded by a smart band and a mobile phone, there are corresponding slow-change signals in a same step counting period. Slow-change signals in the motion data of the smart band and the mobile phone are analyzed. If slow-change signals generated in a same (or similar) period have a matched waveform characteristic, it indicates that one step is counted.

A method for determining the quantity of steps of the user may alternatively be, for example converting, by the first device, the motion data of the at least two devices from time-domain data to frequency-domain data, and determining, by the first device, the quantity of steps of the user according to a characteristic of the converted-to frequency-domain data. When the user walks, frequency-domain data converted from motion data of the at least two devices in a same step counting period have a same or similar characteristic.

Figure 6:
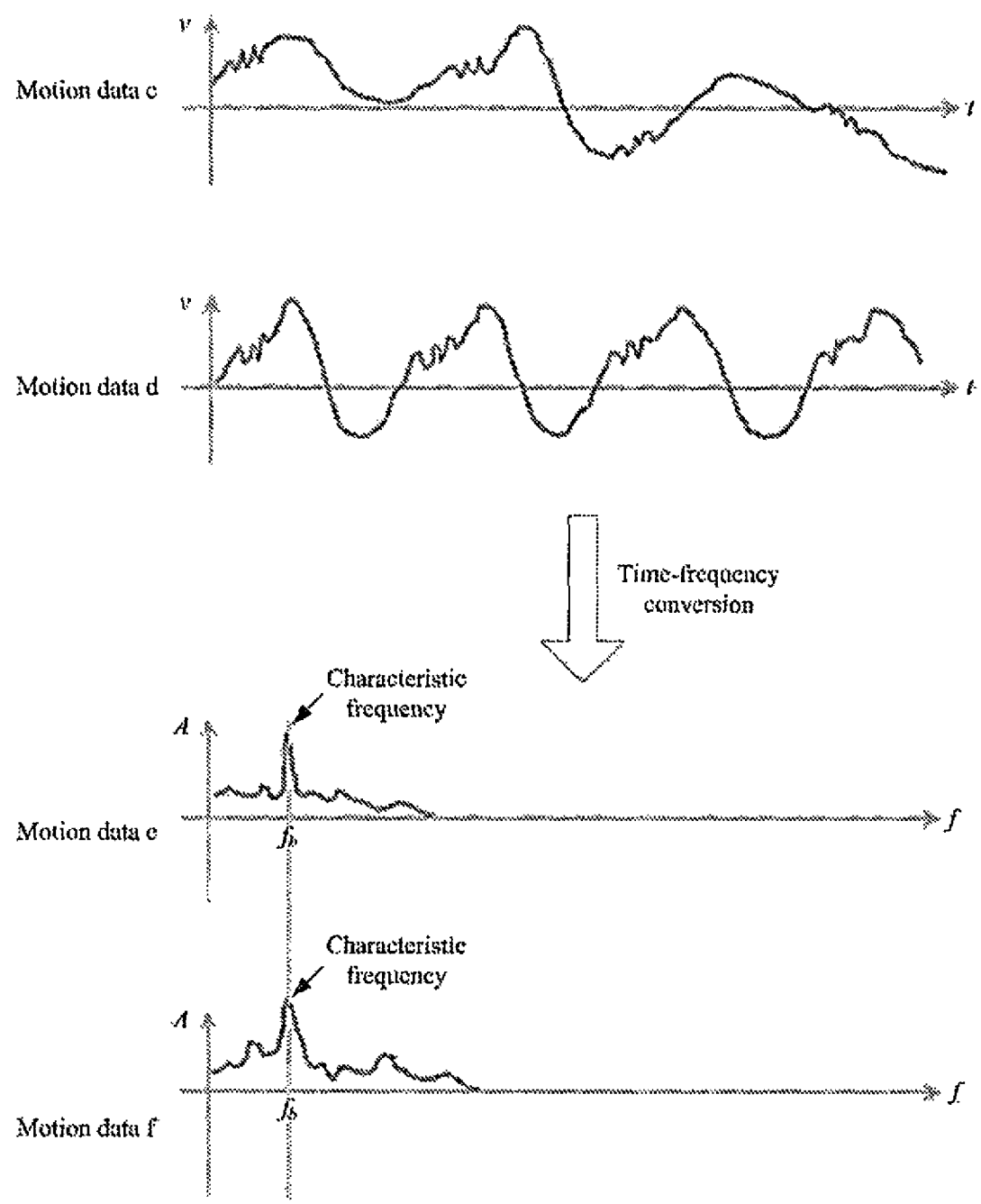
FIG. 6 illustrates schematic diagrams of time-frequency conversion of motion data according to an embodiment of the present disclosure.

When a user's walking movement is standard, motion data of signals of a mobile phone and a smart band may be analyzed from a perspective of frequency domain. FIG. 6 illustrates schematic diagrams of time-frequency conversion of motion data according to an embodiment of the present disclosure. As shown in FIG. 6, time-frequency conversion may be performed on motion data c and motion data d to obtain motion data e and motion data f that are shown in the lower part of FIG. 6. The motion data e is frequency-domain signal data that is corresponding to the motion data c, and the motion data f is frequency domain signal data that is corresponding to the motion data d. Characteristic frequencies may be extracted from the motion data e and the motion data f. In a walking state, there are same or similar characteristic frequencies in two groups of motion data, and a quantity of walking steps of the user in a unit time may be calculated according to a frequency value of the same characteristic frequency. By means of dynamically capturing the same characteristic frequency, dynamic calculation may be performed and a total quantity of walking steps which continuously accumulates with time may be dynamically calculated. As shown in FIG. 6, the motion data e and the motion data f have a same characteristic frequency at $f_b$, and a calculated quantity of steps accumulates by 1. When the user is in a non-walking state, there is no same or similar characteristic frequency in two groups of motion data, and in this case, a calculated quantity of steps does not increase.

Certainly, there may exist another walking characteristic signal matching method, which is not enumerated herein in this embodiment of the present disclosure.

In addition, the method in this embodiment of the present disclosure may be further generalized in a scenario in which a quantity of steps of the user is calculated according to multiple groups of motion data. If in a same (or similar) period, each group of motion data has a same or similar walking characteristic, it may be determined that step counting occurs. For a method of determining the same or similar walking characteristic, reference may be made to the determining method used when there are two groups of motion data. Details are not repeated herein in this embodiment of the present disclosure.

Optionally, in the foregoing embodiment of the present disclosure, step S101 may further include obtaining, by the first device, position information of multiple devices carried by the same user, and obtaining, by the first device according to the position information of the multiple devices, step counting data from at least two devices located at different limb parts or positions of the user.

The first device may choose step counting data from each device according to the position information of the multiple devices carried by the same user. When obtaining position information of a device, the first device may perform analysis and determining according to step counting data of each device to obtain the position information of the device. Alternatively, the first device may directly receive position information sent by each device. Each device may perform analysis and determining according to step counting data obtained by the device to obtain position information of the device, or each device may perform analysis and determining according to data that is collected by a gyroscope, a sensor, or the like of the device to obtain position information of the device, or the like. Reference may be made to the other approaches for a specific implementation of a method of obtaining, by the first device, position information of the device according to step counting data of the device, or of a method of obtaining, by each device, position information of the device according to data that is collected by a gyroscope, a sensor, or the like of the device. Details are not described herein in this embodiment of the present disclosure.

Further, for multiple pieces of step counting data at a same limb part or position, the first device may choose one piece of the multiple pieces of step counting data at a same limb part or position to participate in an operation. That is, the first device may obtain the step counting data from the at least two devices located at the different limb parts or positions of the user.

For example, the first device receives step counting data of four devices step counting data 1 (a left arm), step counting data 2 (a right arm), step counting data 3 (a body), and step counting data 4 (a left arm). In this case, the first device may choose one from the step counting data 1 and the step counting data 4 to participate in an operation. The first device may choose the step counting data 1, 2, and 3 to participate in the operation, or choose the step counting data 2, 3, and 4 to participate in the operation, or the like.

Certainly, it is also allowed to choose multiple pieces of step counting data at a same limb part or position to participate in a collaborative operation, and even all step counting data may be chosen to participate in a collaborative operation, but this increases unnecessary amount of calculation.

In this embodiment of the present disclosure, the first device determines the quantity of steps of the user according to the step counting data of the at least two devices of the same user in order to avoid a step counting error caused when a single device performs step counting, thereby improving step counting accuracy.

The following further describes the method in this embodiment of the present disclosure with reference to specific embodiments.

Figure 7:
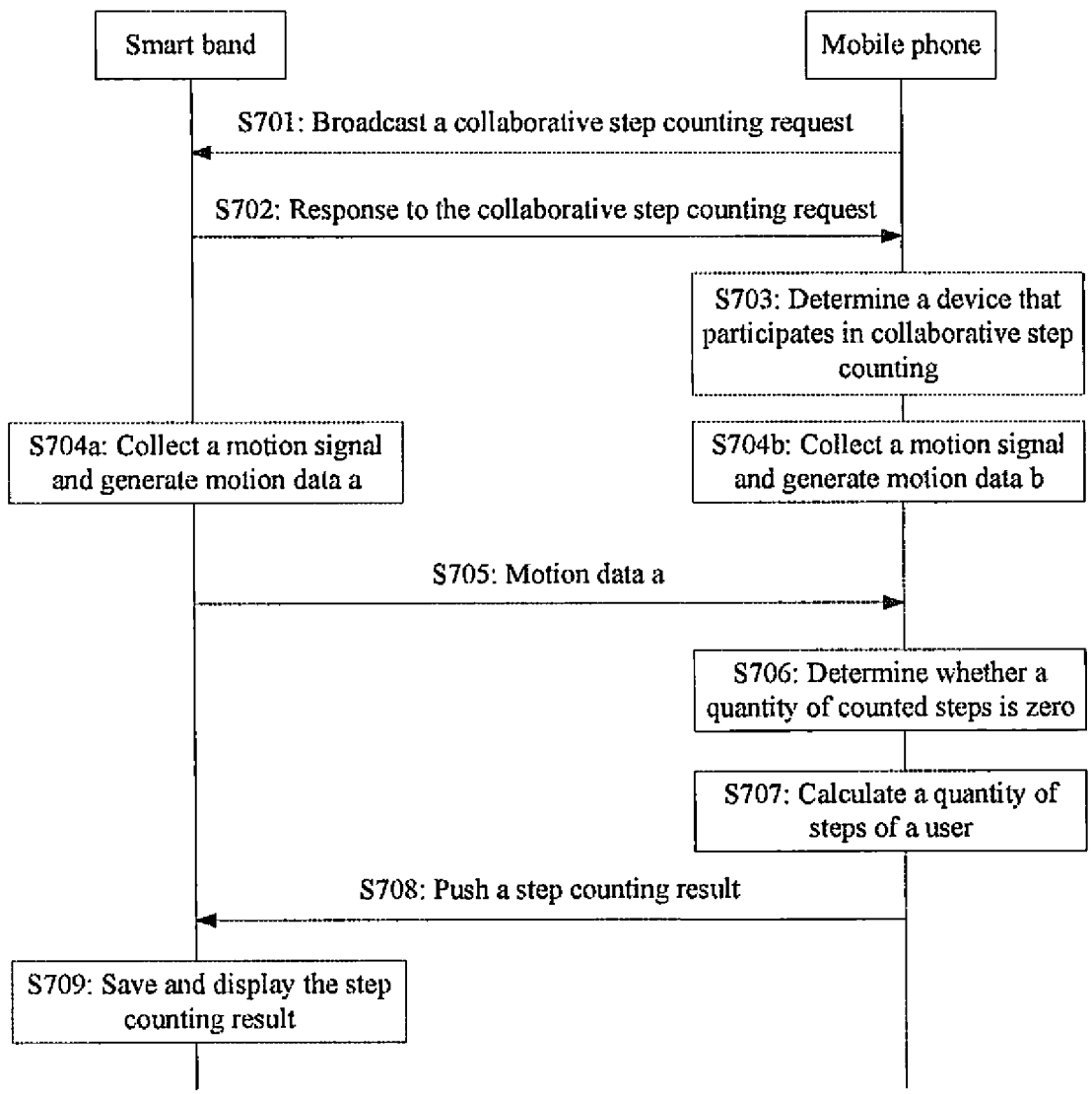
FIG. 7 illustrates an interaction flowchart of collaborative step counting of two devices according to an embodiment of the present disclosure.

FIG. 7 illustrates an interaction flowchart of collaborative step counting of two devices according to an embodiment of the present disclosure. For example, the two devices are a smart band and a mobile phone, respectively. FIG. 7 shows an interaction flowchart of only one smart band and only one mobile phone, and in actual application, there may be multiple smart bands or multiple mobile phones. A user may choose one from the devices as a first device, that is, a calculation device configured to calculate a step counting result according to multiple pieces of step counting data. In this embodiment of the present disclosure, the mobile phone is designated as the first device in the embodiment shown in FIG. 1, that is, the calculation device, the smart band is designated as a step counting device that participates in the collaborative step counting, that is, an auxiliary device configured to obtain step counting data of the auxiliary device and gather step counting data to the calculation device. In addition, the smart band and the mobile phone in this embodiment of the present disclosure are devices worn or carried by a same user, and can communicate with each other using a network between them. The network between the devices may be an Internet of Things or another wireless network. A connection between the devices may be a wireless connection based on a BLUETOOTH technology, an infrared technology, or the like.

Step S701: The mobile phone broadcasts a collaborative step counting request.

The mobile phone broadcasts the collaborative step counting request on the network between the devices to request a step counting device on the network to participate in collaborative step counting.

Step S702: The smart band sends a response to the collaborative step counting request to the mobile phone.

After receiving the collaborative step counting request of the mobile phone, the smart band may participate in the collaborative step counting by sending the response.

Step S703: The mobile phone determines a step counting device that participates in collaborative step counting.

In this embodiment of the present disclosure, after receiving the response of the smart band, the mobile phone may determine the smart band as the step counting device that participates in the collaborative step counting.

It should be understood that in actual application, steps S701 to S703 are replaceable and may be replaced in another manner. For example, the mobile phone may be directly configured as the calculation device, the smart band may be directly configured as the auxiliary device, and when a device accesses a network, a device on the network is notified by means of broadcast. For another example, if there are only two devices such as the smart band and the mobile phone, when a connection is established between the two devices, the mobile phone may determine the smart band as the step counting device that participates in the collaborative step counting, or the like.

Step S704a: The smart band collects a motion signal and generates motion data a.

The smart band collects its motion signal, marks the motion signal with a time stamp, and generates the motion data a.

The smart band may collect the motion signal using a gyroscope, a vibrator, or the like of the smart band, and generate the motion data a. For a specific implementation thereof, reference may be made to the other approaches. Details are not described herein in this embodiment of the present disclosure.

The smart band may further determine, according to the threshold method mentioned in step S101, whether step counting data of the smart band meets a zero step counting condition.

Step S704b: The mobile phone collects a motion signal and generates motion data b.

This step may be performed using a method same as that of step S704a. Details are not repeated herein.

Step S705: The smart band sends the motion data a to the mobile phone.

The smart band may directly send the motion data a to the mobile phone.

Alternatively, when the smart band determines whether step counting data of the smart band meets the zero step counting condition in step S704a, if the smart band determines that the motion data a meets the zero step counting condition, the smart band may directly send a result that a quantity of steps is zero, that is, a zero step counting result to the mobile phone, or if the smart band determines that the motion data a does not meet the zero step counting condition, the smart band sends the motion data a to the mobile phone.

Step S706: The mobile phone determines whether a quantity of counted steps is zero.

The mobile phone may determine whether the quantity of counted steps is zero, according to the step counting data sent by the smart band and the motion data b collected by the mobile phone.

If the step counting data sent by the smart band meets the zero step counting condition or step counting data of the mobile phone meets the zero step counting condition, the mobile phone may directly determine that a quantity of steps of the user is zero, and perform step S708 to push this step counting result to the smart band.

If the smart band sends the motion data a, the mobile phone may calculate a cross-correlation coefficient of the motion data a and the motion data b, and compare the calculated cross-correlation coefficient with a cross-correlation threshold. If an absolute value of the cross-correlation coefficient of the motion data a and the motion data b is less than the cross-correlation threshold, the mobile phone may determine that the quantity of steps of the user is zero, and perform step S708 to push this step counting result to the smart band, otherwise, perform step S707.

Step S707: Calculate a quantity of steps of a user.

The mobile phone calculates the quantity of steps of the user according to the motion data a and the motion data b. For specific implementation, reference may be made to descriptions in step S102. Details are not repeated herein in this embodiment of the present disclosure.

Step S708: Push a step counting result.

After obtaining the quantity of steps of the user by means of calculation, the mobile phone pushes the step counting result to the smart band.

Step S709: Save and display the step counting result.

After obtaining the step counting result pushed by the mobile phone, the smart band saves the step counting result and displays step counting result on a display unit of the smart band.

Certainly, it should be understood that after calculating the quantity of steps of the user, the mobile phone may also display this calculation result on a screen of the mobile phone, or push the result to the smart band at the same time when displaying the result on a screen of the mobile phone.

In this embodiment of the present disclosure, the mobile phone obtains, by means of calculation, the quantity of steps of the user according to the motion data collected by the smart band and the mobile phone in order to avoid a step counting error caused when a single device performs step counting, thereby improving step counting accuracy.

It should be understood that in this embodiment of the present disclosure, alternatively, the smart band may be used as the calculation device or a management device. In addition, when more than three devices participate in collaborative step counting, the calculation device or the management device may alternatively not participate in obtaining step counting data, and merely serve as the calculation device or the management device.

Figure 8:
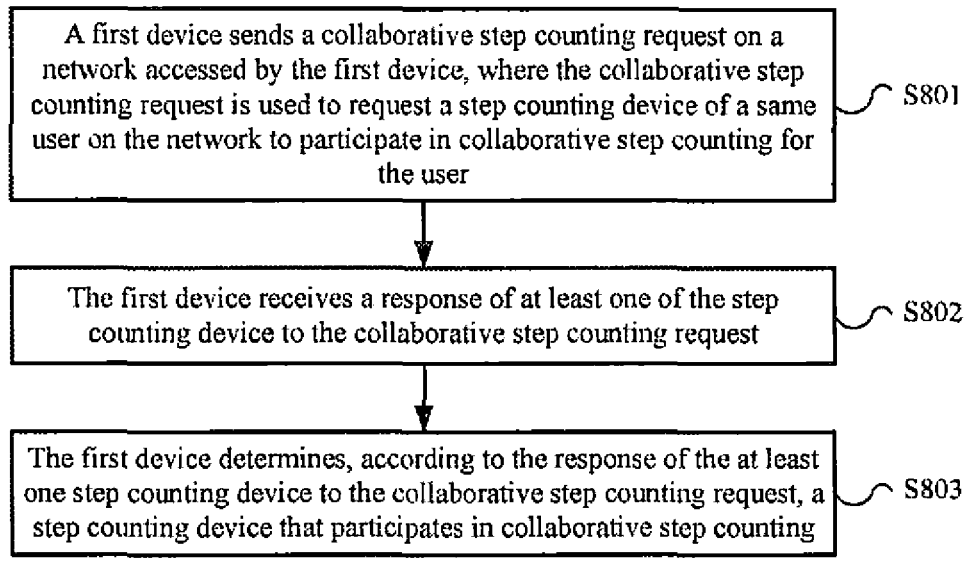
FIG. 8 illustrates a flowchart of another step counting method according to an embodiment of the present disclosure.

FIG. 8 shows a flowchart of another step counting method according to an embodiment of the present disclosure. The method in FIG. 8 is executed by a management device. In this embodiment of the present disclosure, the management device is a first device. The method includes the following steps.

Step S801: The first device sends a collaborative step counting request on a network accessed by the first device, where the collaborative step counting request is used to request a step counting device of a same user on the network to participate in collaborative step counting for the user.

The first device, as the management device, may send the collaborative step counting request to request the step counting device to participate in the collaborative step counting.

Optionally, if the first device is the step counting device, the first device may determine, based on step counting data reliability of the first device, whether to initiate the collaborative step counting request.

For example, the first device may determine the step counting data reliability of the first device according to information about a position of the first device on the user (a wearing part).

In a specific application scenario, devices 1 to 5 are step counting devices worn or carried by the user, and on a network, the device 3 is the management device, that is, the first device, and is configured to determine whether to initiate the collaborative step counting request.

When the device 3 determines that information about a position of the device 3 on the user is a body part of the user (for example, in a pocket of trousers), the device 3 may determine that step counting data of the device 3 is highly reliable. In this case, if step counting is performed according to the step counting data of the device 3, an obtained step counting result is relatively accurate, and there is no need to perform a collaborative step counting operation, that is, there is no need to initiate the collaborative step counting request.

For another example, when the device 3 determines that information about a position of the device 3 on the user is an arm part (for example, the device 3 is worn on a wrist), the device 3 may determine that step counting data of the device 3 is not reliable. In this case, if step counting is performed according to the step counting data of the device 3, an obtained step counting result may have a relatively great error. To avoid the error, the device 3 may initiate a collaborative step counting procedure.

The device 3 may determine the position information of the device on the user using a gyroscope, a sensor, or the like. For a specific implementation thereof, reference may be made to the other approaches. Details are not described herein in this embodiment of the present disclosure.

When the first device determines to initiate the collaborative step counting, the first device may broadcast the collaborative step counting request on the network, or send the collaborative step counting request to devices on the network one by one.

Step S802: The first device receives a response of at least one of a step counting device to the collaborative step counting request.

It should be noted that the first device may receive responses of at least two step counting devices including the first device. For example, when the first device has a step counting function and responds to the collaborative step counting request, the first device can receive the response of the at least one step counting device to the collaborative step counting request, completing the collaborative step counting for the user.

Alternatively, the first device may receive responses of at least two step counting devices other than the first device. For example, when the first device does not have a step counting function, or has a step counting function but does not participate in the collaborative step counting, the first device receives responses of the at least two step counting devices to the collaborative step counting request, and these two step counting devices that respond to the collaborative step counting complete the collaborative step counting for the user. In this case, the first device and the other step counting devices may be carried by different users, or may be carried by a same user.

Step S803: The first device determines, according to the response of the at least one step counting device to the collaborative step counting request, a step counting device that participates in collaborative step counting.

In this embodiment of the present disclosure, the first device may determine, in various manners, the step counting device that participates in the collaborative step counting.

For example, the step counting device that participates in the collaborative step counting may be determined according to position information of the step counting device. A response of the step counting device to the collaborative step counting request carries the position information of the step counting device.

In this embodiment of the present disclosure, the first device may be a step counting device that participates in the collaborative step counting, or may be a step counting device that does not participate in the collaborative step counting.

When the first device is the step counting device that participates in the collaborative step counting, determining, according to position information of the step counting device, the step counting device that participates in the collaborative step counting may be, for example choosing, by the first device according to position information of the at least one step counting device, N step counting devices from the at least one step counting device as the step counting device that participates in the collaborative step counting, where N is an integer greater than or equal to 1, positions of the N step counting devices are different from a position of the first device, and when N is greater than 1, the N step counting devices are located at different limb parts or positions of the user.

It should be understood that when a value of N is 1, the N step counting devices are located at one limb part or position of the user, when a value of N is greater than 1, the N step counting devices are located at N different limb parts or positions of the user, and the positions of the N step counting devices are different from the position of the first device.

In example 1, the device 3 initiates the collaborative step counting request, and the device 3 also participates in the collaborative step counting. It is assumed that the device 3 is a step counting device in a pocket of trousers, and the devices 1, 2, 4, and 5 respond to the collaborative step counting request, and are step counting devices in a left hand, a right hand, a pocket of trousers, and a right hand, respectively. In this case, the device 3 may exclude the device 4 (the pocket of trousers), choose the device 1 (the left hand) to participate in the collaborative step counting, and choose one device from the device 2 and the device 5 (the right hand) to participate in the collaborative step counting. Certainly, the device 3 may alternatively choose one device from the devices 1, 2, and 5 to participate in the collaborative step counting.

When the first device is not the step counting device that participates in the collaborative step counting, determining the step counting device that participates in the collaborative step counting may alternatively be, for example choosing, by the first device according to position information of the at least one step counting device, N step counting devices from the at least one step counting device as the step counting device that participates in the collaborative step counting, where N is an integer greater than 1, and the N step counting devices are located at different limb parts or positions of the user. In this case, the at least one step counting device is multiple step counting devices.

In example 2, the device 3 initiates the collaborative step counting request, and the device 3 does not participate in the collaborative step counting. It is assumed that the device 3 is a step counting device in a pocket of trousers, and the devices 1, 2, 4, and 5 respond to the collaborative step counting request, and are step counting devices in a left hand, a right hand, a pocket of trousers, and a right hand, respectively. In this case, the device 3 only needs to choose at least two devices from the devices 1, 2, 4, and 5, but does not choose both the device 2 and the device 5.

For another example, the first device may determine, according to signal quality of communication between a step counting device and the first device, a step counting device that participates in the collaborative step counting.

Determining, according to signal quality, a step counting device that participates in the collaborative step counting may be, for example determining, by the first device according to signal quality of the at least one step counting device, a step counting device that is with signal quality greater than a signal quality threshold and that is of the at least one step counting device, as the step counting device that participates in the collaborative step counting, where the signal quality is quality of a signal between the step counting device and the first device, and a response of the step counting device to the collaborative step counting request carries signal quality information of the step counting device.

In example 3, the signal quality may be a received signal strength indicator (RSSI), and the response of the step counting device to the collaborative step counting request may carry the RSSI. Participating in the collaborative step counting is allowed only when an RSSI value is greater than the signal quality threshold. Because a wireless signal between devices attenuates rapidly as a distance between the devices increases, a limitation is imposed on the signal quality in order to limit an effective range of function of the collaborative step counting to a relatively short distance, for example, in a scenario in which a user wears a smart band and carries a mobile phone at the same time.

The solution of the present disclosure is not intended to still work when a distance between step counting devices is relatively long, nor an effective distance is intended to be limited to an extremely small value, causing that the solution of the present disclosure does not work when the user carries the step counting devices at the same time. To this end, determining an RSSI threshold is crucial. In an alternative solution, the RSSI threshold may be determined using a body area network rule. A smart band and a mobile phone are used as examples. The user wears the smart band on the wrist, and the mobile phone keeps a BLUETOOTH connection with the smart band and records an RSSI in real time. After the user holds the mobile phone in a hand, puts it in a pocket of clothes or in a pocket of trousers, puts it in a carry-on bag, or puts it in any other places of the user's body that the mobile phone may be put in, a smallest RSSI value is obtained, and the value is used as the RSSI threshold in the solution of the present disclosure, that is, the signal quality threshold. In RSSI testing, a place in which the mobile phone is placed is also a scenario in which the solution of the present disclosure is intended to work. Putting the mobile phone in the carry-on bag may cause the RSSI to decrease sharply. If the solution is not intended to work when the mobile phone is put in the bag, the mobile phone may not be put in the bag during RSSI testing and recording.

When an RSSI value between a step counting device and the first device is greater than the signal quality threshold, it may be determined that the step counting device is the step counting device that participates in the collaborative step counting, otherwise, it may be determined that the step counting device is not the step counting device that participates in the collaborative step counting.

For another example, the step counting device that participates in the collaborative step counting may be determined according to a performance parameter of the step counting device.

Determining, according to a performance parameter of the step counting device, the step counting device that participates in the collaborative step counting may be, for example choosing, by the first device according to a performance parameter of the at least one step counting device, N step counting devices from the at least one step counting device as the step counting device that participates in the collaborative step counting, where N is an integer greater than or equal to 1, the N step counting devices are N step counting devices with better performance parameters of the at least one step counting device, and a response of the step counting device to the collaborative step counting request carries the performance parameter of the step counting device.

In example 4, the device 3 initiates the collaborative step counting request, and the devices 1, 2, 4, and 5 respond to the collaborative step counting request and add their performance parameters to responses to the collaborative step counting request. If the devices 1 and 2 have better performance, the device 3 may choose the devices 1 and 2 to participate in the collaborative step counting. It should be understood that if the device 3 participates in the collaborative step counting, one or more devices may be chosen to participate in the collaborative step counting, if the device 3 does not participate in the collaborative step counting, at least two devices need to be chosen to participate in the collaborative step counting.

In addition, the first device may further determine M step counting devices that have relatively good performance parameters and that are of the at least one step counting device excluding the N step counting devices, as candidate collaborative step counting devices according to the performance parameter of the at least one step counting device, where the candidate collaborative step counting devices are step counting devices that have the capability to perform collaborative step counting but do not participate in the collaborative step counting, and M is an integer greater than or equal to 1.

Example 4 is used for further description. If the device 4 is a step counting device with performance second only to the device 1 and the device 2, the device 3 may choose the device 4 as a candidate collaborative step counting device.

In addition, when a performance parameter of a second device of the candidate collaborative step counting devices indicates better performance than a performance parameter of a third device of the step counting devices that participate in the collaborative step counting does, the first device substitutes the second device for the third device to participate in the collaborative step counting.

Still, example 4 is used for further description. If the performance of the device 4 is better than that of the device 1, the device 3 may choose to use the device 4 in place of the device 1 as the step counting device that participates in the collaborative step counting.

After choosing the step counting device that participates in the collaborative step counting, the first device further needs to designate a device of the step counting device as a calculation device. The calculation device is a device that is configured to calculate a step counting result according to multiple pieces of step counting data and that is of the step counting device participating in the collaborative step counting.

In an implementation scenario, the performance parameter includes a quantity of electricity and a calculation capability. Determining the calculation device according to the quantity of electricity and the calculation capability may be, for example choosing, by the first device, a step counting device that has a largest quantity of electricity and/or a strongest calculation capability and that is of the step counting device participating in the collaborative step counting, as the calculation device according to a quantity of electricity and/or a calculation capability of the at least one step counting device, where the calculation device is a device that is configured to calculate a step counting result according to multiple pieces of step counting data and that is of the step counting device participating in the collaborative step counting.

In example 5, the device 3 initiates the collaborative step counting request, and the devices 1, 2, 4, and 5 respond to the collaborative step counting request and add their quantity of electricity and calculation capability information to responses to the collaborative step counting request. The devices 1, 2, and 5 are of sufficient quantity of electricity, and the device 4 is of insufficient quantity of electricity. The devices 1, 2, and 4 have relatively strong calculation capabilities, and the device 5 has a relatively poor calculation capability. If only the quantity of electricity is considered, the device 3 may determine one of the devices 1, 2, and 5 as the calculation device. If only the calculation capability is considered, the device 3 may determine one of the devices 1, 2, and 4 as the calculation device. If both the quantity of electricity and the calculation capability are considered, the device 3 may determine the device 1 or the device 2 as the calculation device.

After determining the calculation device, the first device may further determine a candidate calculation device, where the candidate calculation device is a device that is capable of substituting for the calculation device to calculate the step counting result according to the multiple pieces of step counting data. The determining a candidate calculation device may be, for example choosing, by the first device, a step counting device with a relatively large quantity of electricity and/or a relatively strong calculation capability as the candidate calculation device according to the quantity of electricity and/or the calculation capability of the at least one step counting device.

Example 5 is used for further description. The device 3 may determine the device 1 or the device 2 as the calculation device. If the device 3 determines the device 1 as the calculation device, the device 3 may further determine the device 2 as the candidate calculation device.

In addition, when performance of the calculation device degrades, the candidate calculation device may substitute for the calculation device. Further, if a performance parameter of a fourth device of the candidate calculation device indicates better performance than that of the calculation device does, the first device substitutes the fourth device for the calculation device.

Still, example 5 is used for further description. The device 3 determines the device 1 as the calculation device, and determines the device 2 as the candidate calculation device. After a period of step counting, if the quantity of electricity of the device 1 is about to run out, and the device 2 still has sufficient quantity of electricity, the device 3 may use the device 2 as the calculation device in place of the device 1.

In this embodiment of the present disclosure, the first device initiates the collaborative step counting request on a network accessed by the first device, and determines, according to the response of the step counting device on the network to the collaborative step counting request, the step counting device that participates in the collaborative step counting such that the step counting device can perform the collaborative step counting, and a step counting error caused when a single device performs step counting can be avoided, thereby improving step counting accuracy.

Figure 9:
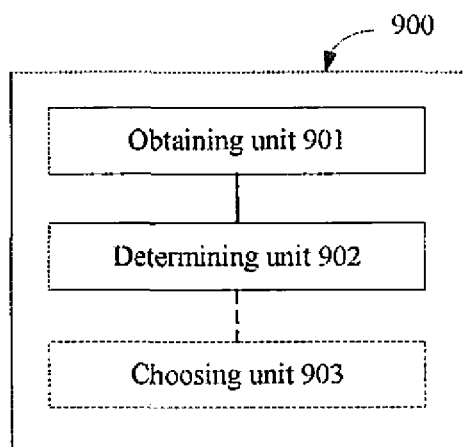
FIG. 9 illustrates a schematic structural diagram of a step counting device according to an embodiment of the present disclosure.

FIG. 9 shows a schematic structural diagram of a step counting device 900 according to an embodiment of the present disclosure.

It should be understood that in this embodiment of the present disclosure, a product form of the step counting device 900 may be a smart band, a mobile phone, or another mobile terminal.

The step counting device 900 may include an obtaining unit 901 configured to obtain step counting data of at least two devices carried by a same user, where the step counting device 900 is one of the at least two devices, or the step counting device 900 is different from the at least two devices, and a determining unit 902 configured to determine a quantity of steps of the user according to the step counting data of the at least two devices.

In this embodiment of the present disclosure, the step counting device 900 determines the quantity of steps of the user according to the step counting data of the at least two devices of the user in order to avoid a step counting error caused when a single device performs step counting, thereby improving step counting accuracy.

Optionally, in an embodiment, the determining unit 902 is further configured to determine the quantity of steps of the user according to a same or similar walking characteristic in motion data of the at least two devices.

Further, in a specific implementation of this embodiment, in a process in which the determining unit 902 is configured to determine the quantity of steps of the user according to a same or similar walking characteristic in the step counting data of the at least two devices, the determining unit 902 is further configured to determine the quantity of steps of the user according to shock vibration signal data in the motion data of the at least two devices. When the user walks, there is corresponding shock vibration signal data in the motion data of the at least two devices in a same step counting period, and the corresponding shock vibration signal data in the motion data of the at least two devices are the same or similar.

Alternatively, in another specific implementation of this embodiment, in a process in which the determining unit 902 is configured to determine the quantity of steps of the user according to a same or similar walking characteristic in motion data of the at least two devices, the determining unit 902 is configured to determine the quantity of steps of the user according to slow-change signal data in the motion data of the at least two devices. When the user walks, there is corresponding slow-change signal data in the motion data of the at least two devices in a same step counting period, and the corresponding slow-change signal data in the motion data of the at least two devices are the same or similar.

Alternatively, in yet another specific implementation of this embodiment, in a process in which the determining unit 902 is configured to determine the quantity of steps of the user according to a same or similar walking characteristic in motion data of the at least two devices, the determining unit 902 is configured to convert the motion data of the at least two devices from time-domain data to frequency-domain data, and determine the quantity of steps of the user according to a characteristic of the converted-to frequency-domain data. When the user walks, frequency-domain data converted from motion data of the at least two devices in a same step counting period have a same or similar characteristic.

Optionally, in another embodiment, the determining unit 902 is further configured to determine that the quantity of steps of the user is zero if step counting data of at least one device in the step counting data of the at least two devices meets a zero step counting condition.

Optionally, in yet another embodiment, the determining unit 902 is further configured to determine a correlation coefficient of the step counting data of the at least two devices, and determine that the quantity of steps of the user is zero if a correlation coefficient of step counting data of any two devices in the step counting data of the at least two devices is less than a first predetermined threshold.

Optionally, in an embodiment, the obtaining unit 901 is further configured to receive step counting data directly sent by the at least two devices.

Optionally, in another embodiment, the obtaining unit 901 is further configured to receive step counting data sent by the at least two devices according to a step counting data obtaining request of the step counting device 900.

Optionally, the obtaining unit 901 is further configured to obtain position information of multiple devices carried by the same user. The step counting device 900 further includes a choosing unit 903, and the choosing unit 903 is configured to obtain, according to the position information of the multiple devices that is obtained by the obtaining unit 901, step counting data from at least two devices located at different limb parts or positions of the user.

The step counting device 900 provided in this embodiment of the present disclosure is configured to implement the methods shown in the embodiments of FIG. 1 and FIG. 7. For details about a working principle of the step counting device 900, a work process of the step counting device 900, and a technical effect produced by the step counting device 900, reference is made to the embodiments shown in FIG. 1 and FIG. 7. Details are not further described herein.

Figure 10:
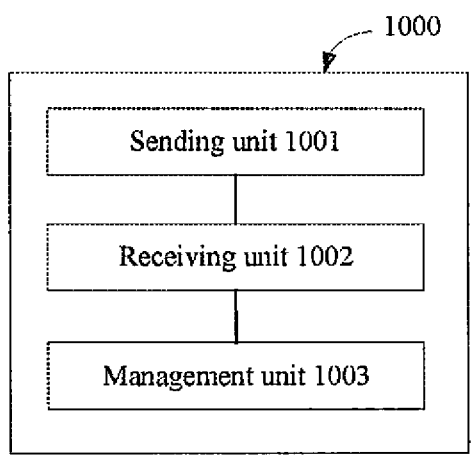
FIG. 10 illustrates a schematic structural diagram of a management device according to an embodiment of the present disclosure.

FIG. 10 shows a schematic structural diagram of a management device 1000 according to an embodiment of the present disclosure.

It should be understood that in this embodiment of the present disclosure, a product form of the management device 1000 may be a smart band, a mobile phone, or another mobile terminal.

The management device 1000 may include a sending unit 1001, a receiving unit 1002, and a management unit 1003.

The sending unit 1001 is configured to send a collaborative step counting request on a network accessed by the management device 1000.

The collaborative step counting request is used to request a step counting device of a same user on the network to participate in collaborative step counting for a user on which the management device 1000 is located, and the user of the step counting device is also the user of the management device 1000.

The receiving unit 1002 is configured to receive a response of at least one of the step counting device to the collaborative step counting request.

The management unit 1003 is configured to determine, according to the response of the at least one step counting device to the collaborative step counting request, a step counting device that participates in the collaborative step counting.

In this embodiment of the present disclosure, the management device 1000 initiates the collaborative step counting request on a network accessed by the management device 1000, and determines, according to the response of the step counting device on the network to the collaborative step counting request, the step counting device that participates in the collaborative step counting such that the step counting device can perform the collaborative step counting, and a step counting error caused when a single device performs step counting can be avoided, thereby improving step counting accuracy.

Optionally, in an embodiment, the management unit 1003 is the step counting device that participates in the collaborative step counting, and the response of the step counting device to the collaborative step counting request carries position information of the step counting device. That the management unit 1003 determines a step counting device that participates in the collaborative step counting may be, for example the management unit 1003 chooses, according to position information of the at least one step counting device, N step counting devices from the at least one step counting device as the step counting device that participates in the collaborative step counting, where N is an integer greater than or equal to 1, positions of the N step counting devices are different from a position of the management device 1000, and when N is greater than 1, the N step counting devices are located at different limb parts or positions of the user.

Optionally, in another embodiment, the management unit 1003 is not the step counting device that participates in the collaborative step counting, and the response of the step counting device to the collaborative step counting request carries position information of the step counting device. That the management unit 1003 determines a step counting device that participates in the collaborative step counting may be, for example the management unit 1003 chooses, according to position information of the at least one step counting device, N step counting devices from the at least one step counting device as the step counting device that participates in the collaborative step counting, where N is an integer greater than 1, the N step counting devices are located at different limb parts or positions of the user, and the at least one step counting device is multiple step counting devices.

Optionally, in another embodiment, the response of the step counting device to the collaborative step counting request carries a performance parameter of the step counting device, and the management unit 1003 is further configured to choose, according to a performance parameter of the at least one step counting device, N step counting devices from the at least one step counting device as the step counting device that participates in the collaborative step counting, where the response of the step counting device to the collaborative step counting request carries the performance parameter of the step counting device, N is an integer greater than or equal to 1, and the N step counting devices are N step counting devices with better performance parameters of the at least one step counting device.

The management unit 1003 is further configured to choose M step counting devices from the at least one step counting device as candidate collaborative step counting devices according to the performance parameter of the at least one step counting device, where the M step counting devices are M step counting devices with relatively good performance parameters of the at least one step counting device excluding the N step counting devices, the candidate collaborative step counting devices are step counting devices that have the capability to perform collaborative step counting but do not participate in the collaborative step counting, and M is an integer greater than or equal to 1.

The management unit 1003 is further configured to substitute the second device for the third device to participate in the collaborative step counting when a performance parameter of a second device of the candidate collaborative step counting devices indicates better performance than a performance parameter of a third device of the step counting devices that participate in the collaborative step counting does.

Optionally, the performance parameter includes a quantity of electricity and a calculation capability, and the management unit 1003 is further configured to choose a step counting device that has a largest quantity of electricity and/or a strongest calculation capability and that is of the step counting device participating in the collaborative step counting, as a calculation device according to a quantity of electricity and/or a calculation capability of the at least one step counting device, where the calculation device is a device that is configured to calculate a step counting result according to multiple pieces of step counting data and that is of the step counting device participating in the collaborative step counting.

The management unit 1003 is further configured to choose a step counting device with a relatively large quantity of electricity and/or a relatively strong calculation capability as a candidate calculation device according to the quantity of electricity and/or the calculation capability of the at least one step counting device, where the candidate calculation device is a device that is capable of substituting for the calculation device and is configured to calculate the step counting result according to the multiple pieces of step counting data.

The management unit 1003 is further configured to if a performance parameter of a fourth device of the candidate calculation device indicates better performance than that of the calculation device does, substitute the fourth device for the calculation device.

The management device 1000 provided in this embodiment of the present disclosure is configured to implement the method shown in the embodiment of FIG. 8. For details about a working principle of the management device 1000, a work process of the management device 1000, and a technical effect produced by the management device 1000, reference is made to the embodiment shown in FIG. 8. Details are not further described herein.

Figure 11:
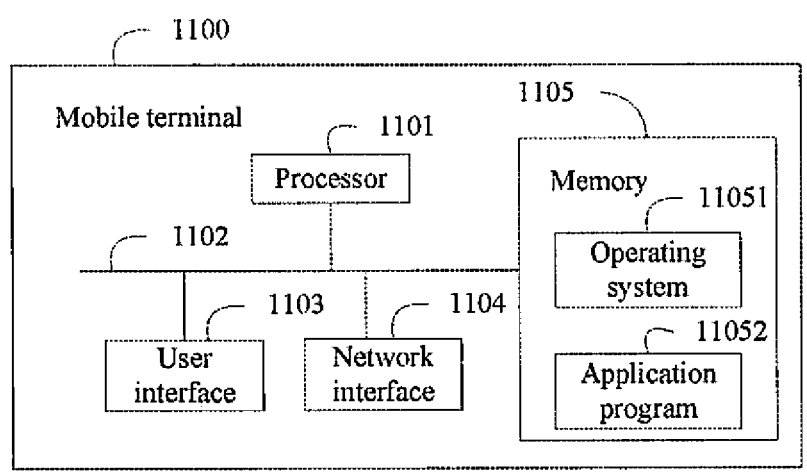
FIG. 11 illustrates a schematic structural diagram of a mobile terminal according to an embodiment of the present disclosure.

FIG. 11 shows a structure of a mobile terminal 1100 according to an embodiment of the present disclosure. The mobile terminal 1100 includes at least one processor 1101, at least one network interface 1104 or a user interface 1103, a memory 1105, and at least one communications bus 1102. The communications bus 1102 is configured to implement connection communication between these components. The mobile terminal 1100 optionally includes the user interface 1103, including a display (for example, a touchscreen, an liquid crystal display (LCD), a cathode ray tube (CRT), holographic imaging (Holographic), or a projector) and a keyboard or a click device (for example, a mouse, a trackball, a touch pad, or a touchscreen). The network interface 1104 and the user interface 1103 may be collectively referred to as a channel interface. In specific application, the mobile terminal 1100 may be a smart band, a mobile phone, or the like.

The memory 1105 may include a read-only memory (ROM) and a random access memory (RAM), and provide an instruction and data for the processor 1101. A part of the memory 1105 may also include a nonvolatile RAM (NVRAM).

In some embodiments, the following elements are stored in the memory 1105, and may execute a module or a data structure, a subset of the module or the data structure, or an extended set of the module or the data structure: an operating system 11051, which includes various system programs, for example, a framework layer, a kernel library layer, and a drive layer that are shown in FIG. 1, and is configured to implement various basic services and process a hardware-based task, and an application program 11052, which includes various application programs, for example, a launcher, a media player, and a browser that are shown in FIG. 1, and is configured to implement various application services.

In this embodiment of the present disclosure, by calling a program or an instruction that is stored in the memory 1105, the processor 1101 is configured to obtain, using the channel interface, step counting data of at least two step counting terminals carried by a same user, where the mobile terminal 1100 is one of the at least two step counting terminals, or the mobile terminal 1100 is different from the at least two step counting terminals, and determine a quantity of steps of the user according to the step counting data of the at least two terminals.

Optionally, in an embodiment, in a process in which the processor 1101 is configured to determine a quantity of steps of the user according to the step counting data of the at least two step counting terminals, the processor 1101 is further configured to determine the quantity of steps of the user according to a same or similar walking characteristic in motion data of the at least two step counting terminals.

Further, in a specific implementation of this embodiment, in a process in which the processor 1101 is configured to determine the quantity of steps of the user according to a same or similar walking characteristic in motion data of the at least two step counting terminals, the processor 1101 is further configured to determine the quantity of steps of the user according to shock vibration signal data in the motion data of the at least two step counting terminals. When the user walks, there is corresponding shock vibration signal data in the motion data of the at least two step counting terminals in a same step counting period, and the corresponding shock vibration signal data in the motion data of the at least two step counting terminals are the same or similar.

Alternatively, in another specific implementation of this embodiment, in a process of determining the quantity of steps of the user according to a same or similar walking characteristic in motion data of the at least two step counting terminals, the processor 1101 further performs determining the quantity of steps of the user according to slow-change signal data in the motion data of the at least two step counting terminals. When the user walks, there is corresponding slow-change signal data in the motion data of the at least two step counting terminals in a same step counting period, and the corresponding slow-change signal data in the motion data of the at least two step counting terminals are the same or similar.

Alternatively, further, in yet another specific implementation of this embodiment, in a process of determining the quantity of steps of the user according to a same or similar walking characteristic in motion data of the at least two step counting terminals, the processor 1101 further performs converting the motion data of the at least two step counting terminals from time-domain data to frequency-domain data, and determine the quantity of steps of the user according to a characteristic of the converted-to frequency-domain data. When the user walks, frequency-domain data converted from motion data of the at least two step counting terminals in a same step counting period have a same or similar characteristic.

Optionally, in another embodiment, in a process in which the processor 1101 is configured to determine a quantity of steps of the user according to the step counting data of the at least two step counting terminals, the processor 1101 is further configured to determine that the quantity of steps of the user is zero if step counting data of at least one step counting terminal in the step counting data of the at least two step counting terminals meets a zero step counting condition.

Optionally, in yet another embodiment, in a process in which the processor 1101 is configured to determine a quantity of steps of the user according to the step counting data of the at least two step counting terminals, the processor 1101 is further configured to determine a correlation coefficient of the step counting data of the at least two step counting terminals, and determine that the quantity of steps of the user is zero if a correlation coefficient of step counting data of any two step counting terminals in the step counting data of the at least two step counting terminals is less than a first predetermined threshold.

Optionally, in an embodiment, in a process of obtaining, using the channel interface, step counting data of at least two step counting terminals carried by a same user, the processor 1101 is further configured to receive step counting data directly sent by the at least two step counting terminals.

Optionally, in another embodiment, in a process of obtaining, using the channel interface, step counting data of at least two step counting terminals carried by a same user, the processor 1101 is further configured to receive, using the channel interface, step counting data sent by the at least two step counting terminals according to a step counting data obtaining request of the mobile terminal 1100.

Optionally, the processor 1101 is further configured to obtain position information of multiple step counting terminals carried by a same user, and obtain step counting data from at least two devices located at different limb parts or positions of the user.

The mobile terminal 1100 provided in this embodiment of the present disclosure is configured to implement the methods shown in the embodiments of FIG. 1 and FIG. 7. For details about a working principle of the mobile terminal 1100, a work process of the mobile terminal 1100, and a technical effect produced by the mobile terminal 1100, reference is made to the embodiments shown in FIG. 1 and FIG. 7. Details are not further described herein.

It can be learned that when the foregoing solution is used, the mobile terminal 1100 determines the quantity of steps of the user according to the step counting data of the at least two devices of the user in order to avoid a step counting error caused when a single device performs step counting, thereby improving step counting accuracy.

Figure 12:
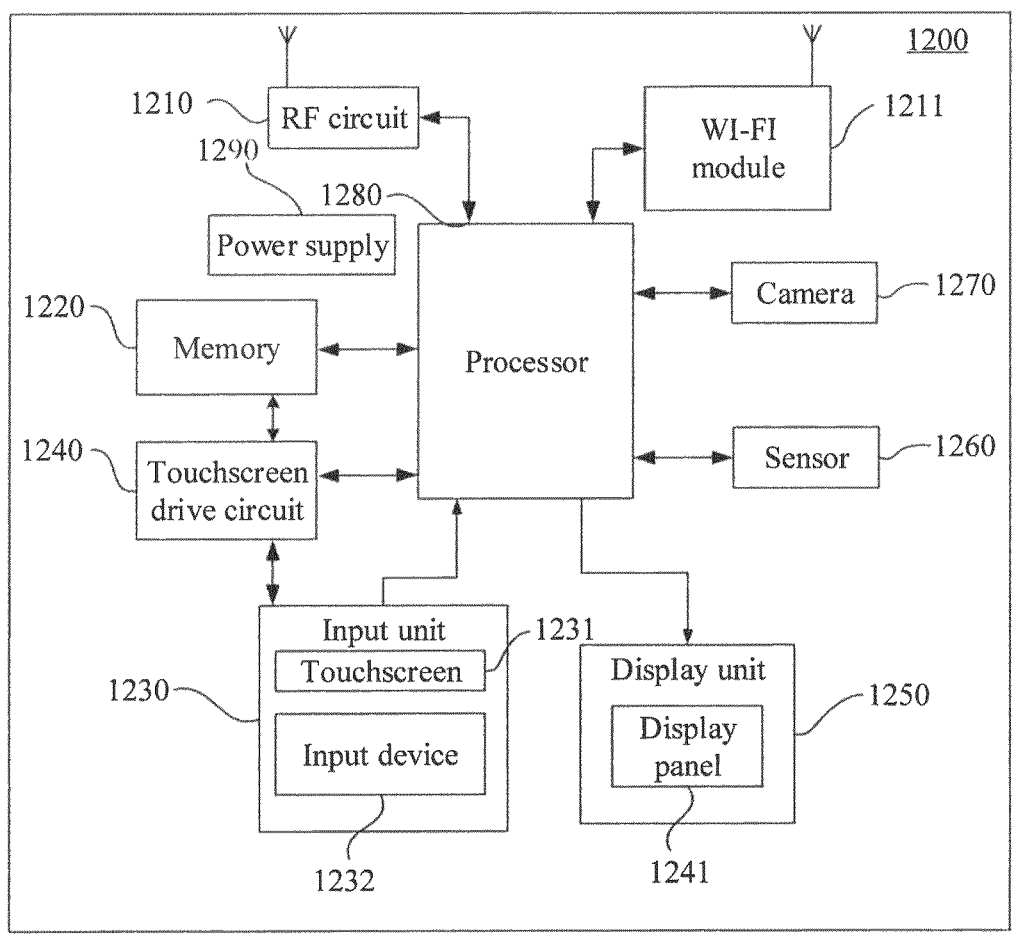
FIG. 12 illustrates a schematic structural diagram of another mobile terminal according to an embodiment of the present disclosure.

FIG. 12 shows a schematic structural diagram of a mobile terminal 1200 according to an embodiment of the present disclosure. The mobile terminal 1200 provided in this embodiment of the present disclosure may be configured to implement the method that is implemented in the embodiment of the present disclosure shown in FIG. 8. For ease of description, only a part related to this embodiment of the present disclosure is shown, and for undisclosed specific technical details, reference is made to the embodiment of the present disclosure shown in FIG. 8.

The mobile terminal 1200 may be a mobile phone, a tablet computer, a notebook computer, a ultra-mobile personal computer (UMPC), a netbook, a personal digital assistant (PDA), or the like. In this embodiment of the present disclosure, the mobile terminal 1200 being a mobile phone is used as an example for description. FIG. 12 shows a block diagram of a part of a structure of the mobile phone that is related to this embodiment of the present disclosure.

As shown in FIG. 12, the mobile phone includes a memory 1220, an input unit 1230, a touchscreen drive circuit 1240, a display unit 1250, a sensor 1260, a camera 1270, a processor 1280, a power supply 1290, and another component. A person skilled in the art can understand that the mobile phone structure shown in FIG. 12 does not constitute a limitation on the mobile phone, and the mobile phone may include more or fewer components than those shown in the figure, or a combination of some components, or components disposed differently.

The following describes each component of the mobile phone in detail with reference to FIG. 12.

The memory 1220 may be configured to store a software program and a module. The processor 1280 runs the software program and the module that are stored in the memory 1220 in order to implement various function applications and data processing of the mobile phone. The memory 1220 may mainly include a program storage area and a data storage area. The program storage area may store an operating system, an application program required by at least one function (such as a sound playback function or an image playback function), or the like. The data storage area may store data that is created according to use of the mobile phone (such as audio data, image data, or a phone book), or the like. In addition, the memory 1220 may include a high-speed RAM, or may include a nonvolatile memory, such as at least one magnetic disk memory, a flash memory, or another volatile solid-state memory.

The input unit 1230 may be configured to receive inputted numeric or character information, and generate a key signal input that is related to user settings and function control of the mobile phone. Further, the input unit 1230 may include a touchscreen 1231 and an input device 1232. The touchscreen 1231, also referred to as a touch panel, may collect a touch operation performed by a user on the touchscreen 1231 or in a position near the touchscreen 1231 (such as an operation performed by the user using a finger, a stylus, or another appropriate object or accessory on the touchscreen 1231 or in a position near the touchscreen 1231), and drive a corresponding connection apparatus according to a preset program. Optionally, the touchscreen 1231 may include two parts, a touch detection apparatus and a touch controller. The touch detection apparatus detects a touch position of the user, detects a signal brought by a touch operation, and sends the signal to the touch controller. The touch controller receives touch information from the touch detection apparatus, converts it to touch point coordinates, sends the touch point coordinates to the processor 1280, and may receive a command sent by the processor 1280 and execute the command. In addition, the touchscreen 1231 may be implemented in various types, such as a resistive type, a capacitive type, an infrared type, and a surface acoustic wave type. In addition to the touchscreen 1231, the input unit 1230 may include the input device 1232. The input device 1232 may include but not limited to one or more of a physical keyboard, a function key (such as a volume control key and a power key), a trackball, a mouse, or a joystick.

The touchscreen drive circuit 1240 may be configured to obtain positions and a quantity of triggered touch control points on the touchscreen 1231. For example, in a capacitive touchscreen, a touchscreen drive circuit may obtain positions and a quantity of triggered touch control points by calculating a capacitance change of each touch control point of the touchscreen. Optionally, the touchscreen drive circuit 1240 may be included in the touch detection apparatus or the touch controller.

The display unit 1250 may be configured to display information inputted by the user, or information and various menus of the mobile phone provided for the user. The display unit 1250 may include a display panel 1241. Optionally, the display panel 1241 may be configured using an LCD or an organic light-emitting diode (OLED) display. Further, the touchscreen 1231 may cover the display panel 1241. When detecting a touch operation performed on the touchscreen 1231 or in a position near the touchscreen 1231, the touchscreen 1231 sends the touch operation to the processor 1280 to determine a touch event type. Then, the processor 1280 provides a corresponding visual output on the display panel 1241 according to the touch event type. A fingerprint collection apparatus may further be disposed above or below the touchscreen 1231, such as an optical fiber. When a finger presses the touchscreen 1231, a fingerprint image is generated according to lines on the finger, and is used for fingerprint collection and recognition. In FIG. 12, the touchscreen 1231 and the display panel 1241 are two separate components implementing input and output functions of the mobile phone. However, in some embodiments, the touchscreen 1231 and the display panel 1241 may be integrated to implement the input and output functions of the mobile phone.

The mobile phone may also include at least one sensor 1260, such as an optical sensor, a motion sensor, a density sensor, a fingerprint sensor, or another sensor. Further, the optical sensor may include an ambient light sensor and a proximity sensor. The ambient light sensor may adjust brightness of the display panel 1241 according to brightness and darkness of ambient light. The proximity sensor may detect whether an object approaches or comes into contact with the mobile phone, and when the mobile phone is moved to an ear, the display panel 1241 is turned off and/or backlit. An accelerometer sensor, as a type of motion sensor, may detect a magnitude of acceleration in each direction (generally, three axes), may detect a magnitude and direction of gravity when the mobile phone is static, and may be configured to recognize a mobile phone posture application (such as landscape-portrait mode switch, related games, or magnetometer posture calibration), vibrate-recognize a related function (such as a pedometer function or knock), or the like. The density sensor may detect density of a substance that the mobile phone comes into contact with. The fingerprint sensor is configured to collect a fingerprint inputted by the user. For another sensor that may be also configured in the mobile phone, such as a gyroscope, a barometer, a hygrometer, a thermometer, or an infrared sensor, details are not further described herein. It should be noted that when there is another fingerprint collection apparatus in the mobile phone, there may be no fingerprint sensor.

The camera 1270 may be a built-in camera, a front-facing camera, or a rear-facing camera.

The processor 1280 is a control center of the mobile phone and is connected to each part of the entire mobile phone by means of various types of interfaces and lines. The processor 1280 implements various functions of the mobile phone and processes data by running or executing the software program and/or the module stored in the memory 1220 and by calling the data stored in the memory 1220 in order to perform overall monitoring on the mobile phone. Optionally, the processor 1280 may include one or more processing units. Preferably, an application processor and a modem processor may be integrated into the processor 1280. The application processor mainly processes an operating system, a user interface, an application program, or the like. The modem processor mainly processes wireless communication. It can be understood that the modem processor may alternatively not be integrated into the processor 1280.

The mobile phone may also include the power supply 1290 (such as a battery) that supplies electric power to each component. Preferably, the power supply may be logically connected to the processor 1280 using a power management system in order to implement functions such as charge management, discharge, and power consumption management using the power management system.

The mobile phone may also include an radio frequency (RF) circuit 1210, a WI-FI module 1211, and a BLUETOOTH module, an audio circuit, and the like that are not shown in FIG. 12. Details are not further described herein.

In this embodiment of the present disclosure, the processor 1280 is configured to read program code and data that are stored in the memory 1220 in order to perform the operations of sending a collaborative step counting request on a network accessed by the mobile terminal 1200, where the collaborative step counting request is used to request a step counting terminal of a same user on the network to participate in collaborative step counting for the user, and the user of the step counting terminal is also the user of the mobile terminal 1200, receiving, by the first device, a response of at least one of the multiple step counting devices to the collaborative step counting request, and determining, according to the response of the at least one step counting device to the collaborative step counting request, a step counting device that participates in the collaborative step counting.

Optionally, in an embodiment, the response of the step counting terminal to the collaborative step counting request carries position information of the step counting terminal, the mobile terminal 1200 is the step counting terminal that participates in the collaborative step counting, and that the processor 1280 determines a step counting device that participates in the collaborative step counting may be, for example choosing, according to position information of the at least one step counting terminal, N step counting terminals from the at least one step counting terminal as the step counting terminal that participates in the collaborative step counting, where N is an integer greater than or equal to 1, positions of the N step counting terminals are different from a position of the mobile terminal 1200, and when N is greater than 1, the N step counting terminals are located at different limb parts or positions of the user.

Optionally, in an embodiment, the response of the step counting terminal to the collaborative step counting request carries position information of the step counting terminal, the mobile terminal 1200 is not the step counting terminal that participates in the collaborative step counting, and that the processor 1280 determines a step counting device that participates in the collaborative step counting may alternatively be, for example choosing, according to position information of the at least one step counting terminal, N step counting terminals from the at least one step counting terminal as the step counting terminal that participates in the collaborative step counting, where N is an integer greater than 1, the N step counting terminals are located at different limb parts or positions of the user, and the at least one step counting terminal is multiple step counting terminals.

Optionally, the response of the step counting terminal to the collaborative step counting request carries a performance parameter of the step counting terminal, and that the processor 1280 determines a step counting device that participates in the collaborative step counting may alternatively be, for example choosing, according to a performance parameter of the at least one step counting terminal, N step counting terminals from the at least one step counting terminal as the step counting terminal that participates in the collaborative step counting, where the response of the step counting terminal to the collaborative step counting request carries the performance parameter of the step counting terminal, N is an integer greater than or equal to 1, and the N step counting terminals are N step counting terminals with better performance parameters of the at least one step counting terminal.

The processor 1280 is further configured to choose M step counting terminals from the at least one step counting terminal as candidate collaborative step counting terminals according to the performance parameter of the at least one step counting terminal, where the M step counting terminals are M step counting terminals with relatively good performance parameters of the at least one step counting terminal excluding the N step counting terminals, the candidate collaborative step counting terminals are step counting terminals that have the capability to perform collaborative step counting but do not participate in the collaborative step counting, and M is an integer greater than or equal to 1.

The processor 1280 is further configured to substitute the second step counting terminal for the third step counting terminal to participate in the collaborative step counting when a performance parameter of a second step counting terminal of the M step counting terminals indicates better performance than a performance parameter of a third step counting terminal of the N step counting terminals does.

Optionally, the performance parameter includes a quantity of electricity and a calculation capability, and the processor 1280 is further configured to substitute the second step counting terminal for the third step counting terminal to participate in the collaborative step counting when a performance parameter of a second step counting terminal of the candidate collaborative step counting terminals indicates better performance than a performance parameter of a third step counting terminal of the step counting terminals that participate in the collaborative step counting does.

The processor 1280 is further configured to choose a step counting terminal with a relatively large quantity of electricity and/or a relatively strong calculation capability as a candidate calculation terminal according to a quantity of electricity and/or a calculation capability of the at least one step counting terminal, where the candidate calculation terminal is a step counting terminal that is capable of substituting for the calculation terminal and is configured to calculate a step counting result according to multiple pieces of step counting data.

The processor 1280 is further configured to substitute the fourth terminal for the calculation terminal if a performance parameter of a fourth terminal of the candidate calculation terminal indicates better performance than that of the calculation terminal does.

The mobile terminal 1200 provided in this embodiment of the present disclosure is configured to implement the method shown in the embodiment of FIG. 8. For details about a working principle of the mobile terminal 1200, a work process of the mobile terminal 1200, and a technical effect produced by the mobile terminal 1200, reference is made to the embodiment shown in FIG. 8. Details are not further described herein.

It can be learned that when the foregoing solution is used, the mobile terminal 1200 initiates the collaborative step counting request on the network that is accessed by the mobile terminal 1200, and determines, according to the response of the step counting device on the network to the collaborative step counting request, the step counting device that participates in the collaborative step counting such that the step counting device can perform the collaborative step counting, and a step counting error caused when a single device performs step counting can be avoided, thereby improving step counting accuracy.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A step counting method, comprising:
    obtaining, by a first device, step counting data of at least two devices carried by a same user, wherein the first device is one of the at least two devices, or wherein the first device is different from the at least two devices; and
    determining, by the first device, a quantity of steps of the user according to the step counting data, and a same or similar walking characteristic in motion data, wherein the motion data comprises shock vibration signal data, and slow-change signal data of the at least two devices, wherein there is corresponding slow-change signal data in the motion data of the at least two devices in a same step counting period when the user walks, and wherein the corresponding slow-change signal data in the motion data of the at least two devices are the same or similar.

2. The method of claim 1, wherein determining the quantity of steps of the user comprises:
    converting, by the first device, the motion data of the at least two devices from time-domain data to frequency-domain data; and
    determining, by the first device, the quantity of steps of the user according to a characteristic of converted-to frequency-domain data, and
    wherein when the user walks, frequency-domain data converted from the motion data of the at least two devices in a same step counting period have a same or similar characteristic.

3. The method of claim 1, wherein determining the quantity of steps of the user comprises determining, by the first device, that the quantity of steps of the user is zero when step counting data of at least one device in the step counting data of the at least two devices meets a zero step counting condition.

4. The method of claim 1, wherein determining the quantity of steps of the user comprises:
    determining, by the first device, a correlation coefficient of the motion data of the at least two devices; and
    determining, by the first device, that the quantity of steps of the user is zero when a correlation coefficient of motion data of any two devices in the motion data of the at least two devices is less than a cross-correlation threshold.

5. The method of claim 1, further comprising:
    obtaining, by the first device, position information of a plurality of devices carried by the same user; and
    obtaining, by the first device according to the position information of the plurality of devices, step counting data from at least two devices located at different limb parts or positions of the user.

6. A step counting device management method, comprising:
    sending, by a first device that participates in collaborative step counting, a collaborative step counting request on a network accessed by the first device, wherein the collaborative step counting request requests a step counting device of a same user on the network to participate in collaborative step counting for the user;
    receiving, by the first device, a response of at least one step counting device to the collaborative step counting request, wherein the response carries position information of the at least one step counting device; and
    choosing, by the first device according to the position information of the at least one step counting devices, N step counting devices as the step counting devices that participate in the collaborative step counting, wherein N is an integer greater than or equal to one, wherein positions of the N step counting devices are different from a position of the first device, and wherein the N step counting devices are located at different limb parts or positions of the user when N is greater than one.

7. The method of claim 6, wherein the response of the at least one step counting devices to the collaborative step counting request carries position information of the at least one step counting devices, wherein the first device does not participate in the collaborative step counting, wherein determining the step counting devices that participate in the collaborative step counting comprises choosing, by the first device according to the position information of the at least one step counting devices, N step counting devices as the step counting devices that participate in the collaborative step counting when the at least one step counting devices comprise a plurality of step counting devices, wherein N is an integer greater than one, and wherein the N step counting devices are located at different limb parts or positions of the user.

8. The method of claim 6, wherein the response of the at least one step counting devices to the collaborative step counting request carries a performance parameter of the at least one step counting devices, wherein determining the step counting devices that participate in the collaborative step counting comprises choosing, by the first device according to the performance parameter of the at least one step counting devices, N step counting devices from the at least one step counting devices as the step counting devices that participate in the collaborative step counting, wherein N is an integer greater than or equal to one, and wherein the N step counting devices are N step counting devices with better performance parameters of the at least one step counting devices.

9. The method of claim 8, further comprising choosing, by the first device, M step counting devices from the at least one step counting devices as candidate collaborative step counting devices according to the performance parameter of the at least one step counting devices, wherein the M step counting devices are M step counting devices with relatively good performance parameters of the at least one step counting devices excluding the N step counting devices, wherein the candidate collaborative step counting devices are step counting devices that have capability to perform the collaborative step counting but do not participate in the collaborative step counting, and wherein M is an integer greater than or equal to one.

10. The method of claim 9, further comprising substituting, by the first device, a second device for a third device to participate in the collaborative step counting when a performance parameter of the second device of the candidate collaborative step counting devices indicates better performance than a performance parameter of the third device of the step counting devices that participate in the collaborative step counting.

11. A mobile terminal, comprising:
a memory configured to store a program;
a channel interface; and
a processor coupled to the memory and the channel interface, wherein the program causes the processor to be configured to:
obtain, using the channel interface, step counting data of at least two step counting terminals located at different limb parts or positions of a user, wherein the mobile terminal is one of the at least two step counting terminals, or wherein the mobile terminal is different from the at least two step counting terminals;
obtain position information of the step counting terminals; and
determine a quantity of steps of the user according to the step counting data.

12. The mobile terminal of claim 11, wherein when determining the quantity of steps of the user, the program further causes the processor to be configured to determine the quantity of steps of the user according to a same or similar walking characteristic in motion data of the at least two step counting terminals.

13. The mobile terminal of claim 11, wherein when determining the quantity of steps of the user, the program further causes the processor to be configured to determine that the quantity of steps of the user is zero when step counting data of at least one step counting terminal in the step counting data of the at least two step counting terminals meets a zero step counting condition.

14. The mobile terminal of claim 11, wherein when determining the quantity of steps of the user, the program further causes the processor to be configured to:
determine a correlation coefficient of motion data of the at least two step counting terminals; and
determine that the quantity of steps of the user is zero when a correlation coefficient of motion data of any two step counting terminals in the motion data of the at least two step counting terminals is less than a cross-correlation threshold.

15. The mobile terminal of claim 11, wherein when obtaining the step counting data of the at least two step counting terminals carried by the same user, the program further causes the processor to be configured to receive, using the channel interface, the step counting data directly from the at least two step counting terminals.

16. The method of claim 8, wherein the performance parameter comprises step counting device power level.

17. The method of claim 8, wherein the performance parameter comprises step counting device calculation capability.

18. The method of claim 6, further comprising:
obtaining, by the first device, motion data step of N step counting devices carried by the user.

19. The method of claim 18, wherein obtaining motion data further comprises:
converting, by the first device, the motion data of the N devices from time-domain data to frequency-domain data; and
determining, by the first device, a quantity of steps of the user according to a characteristic of converted-to frequency-domain data, and
wherein when the user walks, frequency-domain data converted from the motion data of the N devices in a same step counting period have a same or similar characteristic.

20. The method of claim 18, wherein obtaining motion data further comprises:
determining, by the first device, a correlation coefficient of the motion data of the N devices; and
determining, by the first device, that a quantity of steps of the user is zero when the correlation coefficient of motion data of the N devices is less than a cross-correlation threshold.

* * * * *